US009231475B2

(12) United States Patent
Takahashi

(10) Patent No.: US 9,231,475 B2
(45) Date of Patent: Jan. 5, 2016

(54) DC-DC CONVERTER, SEMICONDUCTOR DEVICE, AND ELECTRONIC DEVICE

(71) Applicant: Semiconductor Energy Laboratory Co., Ltd., Atsugi-shi, Kanagawa-ken (JP)

(72) Inventor: Kei Takahashi, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/632,164

(22) Filed: Feb. 26, 2015

(65) Prior Publication Data

US 2015/0249385 A1    Sep. 3, 2015

(30) Foreign Application Priority Data

Feb. 28, 2014    (JP) ................. 2014-038497

(51) Int. Cl.
*H05B 37/02* (2006.01)
*G05F 1/00* (2006.01)
*H02M 3/158* (2006.01)

(52) U.S. Cl.
CPC ............... *H02M 3/158* (2013.01); *H05B 37/02* (2013.01)

(58) Field of Classification Search
CPC .... H05B 37/02; H05B 33/08; H05B 33/0809; H05B 33/0842; H05B 33/0875; H05B 33/0887; G05F 1/56; G05F 1/563; G05F 1/565
USPC ............. 315/209 R, 224–226, 291, 307, 308; 323/283–285, 351
See application file for complete search history.

(56) References Cited

U.S. PATENT DOCUMENTS

| 8,710,762 | B2 | 4/2014 | Takahashi et al. | |
|---|---|---|---|---|
| 8,766,608 | B2 | 7/2014 | Yamazaki et al. | |
| 8,816,662 | B2 | 8/2014 | Takahashi et al. | |
| 8,922,182 | B2 | 12/2014 | Takahashi et al. | |
| 8,963,517 | B2 | 2/2015 | Yamazaki et al. | |
| 2007/0063684 | A1* | 3/2007 | Adragna et al. | 323/284 |
| 2010/0066337 | A1* | 3/2010 | Gong et al. | 323/285 |
| 2011/0089927 | A1 | 4/2011 | Yamazaki et al. | |
| 2011/0254523 | A1 | 10/2011 | Ito et al. | |
| 2011/0285426 | A1 | 11/2011 | Takahashi et al. | |
| 2012/0019222 | A1 | 1/2012 | Kimura et al. | |
| 2012/0140523 | A1 | 6/2012 | Takahashi et al. | |
| 2012/0274401 | A1 | 11/2012 | Watanabe | |
| 2012/0293893 | A1 | 11/2012 | Sato | |

(Continued)

FOREIGN PATENT DOCUMENTS

JP    2013-178495 A    9/2013

*Primary Examiner* — Jimmy Vu
(74) *Attorney, Agent, or Firm* — Fish & Richardson P.C.

(57) ABSTRACT

A DC-DC converter with improved voltage conversion efficiency is provided. The DC-DC converter includes a first circuit configured to generate a first signal containing data on current flowing through a load, a second circuit configured to amplify the first signal, a third circuit configured to generate a second signal containing data on voltage applied to the load, a fourth circuit configured to hold the second signal, a fifth circuit configured to amplify the second signal held by the fourth circuit, a sixth circuit configured to correct a difference in electrical characteristics between the second circuit and the fifth circuit, a seventh circuit configured to convert a first voltage to a second voltage supplied to the load, and an eighth circuit configured to control a level of the second voltage generated by the seventh circuit in accordance with either the amplified first signal or the amplified second signal.

16 Claims, 16 Drawing Sheets

(56) References Cited

U.S. PATENT DOCUMENTS

| | | |
|---|---|---|
| 2012/0306467 A1 | 12/2012 | Ohmaru |
| 2013/0193874 A1 | 8/2013 | Takahashi et al. |
| 2013/0261835 A1 | 10/2013 | Takahashi et al. |
| 2015/0034948 A1 | 2/2015 | Takahashi |
| 2015/0035509 A1 | 2/2015 | Koyama et al. |
| 2015/0035514 A1 | 2/2015 | Koyama et al. |
| 2015/0035573 A1 | 2/2015 | Koyama et al. |

* cited by examiner

DC-DC CONVERTER, SEMICONDUCTOR DEVICE, AND ELECTRONIC DEVICE

BACKGROUND OF THE INVENTION

1. Field of the Invention

One embodiment of the present invention relates to a DC-DC converter and a semiconductor device using the DC-DC converter.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a liquid crystal display device, a light-emitting device, a lighting device, a power storage device, a storage device, a method for driving any of them, and a method for manufacturing any of them.

2. Description of the Related Art

A DC-DC converter is a constant-voltage circuit with which a constant output voltage can be obtained regardless of the value of an input voltage, and the DC-DC converter is used for a power supply circuit together with a rectification circuit or the like. There are roughly two feedback methods in generally used switching DC-DC converters: voltage mode control in which data on output voltage is fed back to a controller, and current mode control in which data on output current in addition to data on output voltage is fed back to a controller. Patent Document 1 discloses a power supply circuit that can switch between current control in which driving is controlled based on data on current flowing through a load and voltage control in which driving is controlled based on data on voltage applied to a load.

REFERENCE

Patent Document

[Patent Document 1] Japanese Published Patent Application No. 2013-178495

SUMMARY OF THE INVENTION

Low power consumption is one of the important factors in evaluating performance of electronic devices. Particularly in the case of a portable electronic device using power accumulated in a capacitor or a battery such as a primary battery or a secondly battery, the DC-DC converter is used to convert a voltage output from the battery, the capacitor, or the like into a voltage of an optimal level. Improvement of power conversion efficiency of the DC-DC converter leads to lower power consumption of a semiconductor device and a long continuous use time of a portable electronic device using the semiconductor device.

In view of the above technical background, an object of one embodiment of the present invention is to provide a DC-DC converter with improved power conversion efficiency. An object of one embodiment of the present invention is to reduce power consumption of a power supply circuit and a semiconductor device including the DC-DC converter.

An object of one embodiment of the present invention is to provide a novel semiconductor device or the like. Note that the descriptions of these objects do not disturb the existence of other objects. In one embodiment of the present invention, there is no need to achieve all of these objects. Other objects will be apparent from and can be derived from the description of the specification, the drawings, the claims, and the like.

A DC-DC converter of one embodiment of the present invention includes a first circuit configured to generate a first signal containing data on current flowing through a load, a second circuit configured to amplify the first signal, a third circuit configured to generate a second signal containing data on voltage applied to the load, a fourth circuit configured to hold the second signal, a fifth circuit configured to amplify the second signal held by the fourth circuit, a sixth circuit configured to correct a difference in electrical characteristics between the second circuit and the fifth circuit, a seventh circuit configured to convert a first voltage to a second voltage supplied to the load, and an eighth circuit configured to control a level of the second voltage generated by the seventh circuit in accordance with either the amplified first signal or the amplified second signal.

A DC-DC converter of one embodiment of the present invention includes a first circuit configured to generate a first signal containing data on current flowing through a load, a second circuit configured to amplify the first signal, a third circuit configured to generate a second signal containing data on voltage applied to the load, a fourth circuit configured to hold the second signal, a fifth circuit configured to amplify the second signal held by the fourth circuit, a sixth circuit configured to correct a difference in electrical characteristics between the second circuit and the fifth circuit, a seventh circuit configured to convert a first voltage to a second voltage supplied to the load, and an eighth circuit configured to control a level of the second voltage generated by the seventh circuit in accordance with either the amplified first signal or the amplified second signal. In this DC-DC converter, the sixth circuit includes a first switch, a first capacitor to which a first potential of the amplified first signal is supplied through the first switch, a second switch, a second capacitor to which a second potential of the amplified second signal is supplied through the second switch, and a ninth circuit configured to generate a first current having a ratio that corresponds to a potential difference between the first potential and the second potential and a second current having a ratio that corresponds to a potential difference between the first potential and the second potential. The first current and the second current are input to the fifth circuit, so that the difference in electrical characteristics between the second circuit and the fifth circuit is corrected.

The first switch and the second switch may each be a transistor including a channel formation region in an oxide semiconductor film.

Furthermore, a semiconductor device of one embodiment of the present invention may include the above-described DC-DC converter.

With one embodiment of the present invention, a DC-DC converter with improved power conversion efficiency can be provided. Furthermore, with one embodiment of the present invention, a power supply circuit and a semiconductor device with reduced power consumption can be provided.

One embodiment of the present invention can provide a novel semiconductor device or the like. Note that the description of these effects does not disturb the existence of other effects. One embodiment of the present invention does not necessarily have all of these effects. Other effects will be apparent from and can be derived from the description of the specification, the drawings, the claims, and the like.

DETAILED DESCRIPTION OF THE INVENTION

Embodiments of the present invention will be described below in detail with reference to the drawings. Note that the present invention is not limited to the following description, and it is easily understood by those skilled in the art that the mode and details can be variously changed without departing from the spirit and scope of the present invention. Therefore, the present invention should not be construed as being limited to the description of the embodiments below.

Note that one embodiment of the present invention includes, in its category, all semiconductor devices that can use a DC-DC converter, such as an integrated circuit, an RF tag, a storage medium, a solar cell, a lighting device using a light-emitting element, and a semiconductor display device. The integrated circuits include, in its category, large scale integrated circuits (LSIs) including a microprocessor, an image processing circuit, a digital signal processor (DSP), a microcontroller, and the like, and programmable logic devices (PLDs) such as a field programmable gate array (FPGA) and a complex PLD (CPLD). In addition, the semiconductor display device includes, in its category, semiconductor display devices including a DC-DC converter, such as a liquid crystal display device, a light-emitting device in which a light-emitting element typified by an organic light-emitting element (OLED) is provided for each pixel, an electronic paper, a digital micromirror device (DMD), a plasma display panel (PDP), and a field emission display (FED).

Note that a "source" of a transistor means a source region that is part of a semiconductor film functioning as an active layer or a source electrode connected to the semiconductor film. Similarly, a "drain" of the transistor means a drain region that is part of the semiconductor film or a drain electrode connected to the semiconductor film. A "gate" means a gate electrode.

The terms "source" and "drain" of a transistor interchange with each other depending on the conductivity type of the transistor or levels of potentials applied to terminals. In general, in an n-channel transistor, a terminal to which a lower potential is applied is called a source, and a terminal to which a higher potential is applied is called a drain. Further, in a p-channel transistor, a terminal to which a lower potential is applied is called a drain, and a terminal to which a higher potential is applied is called a source. In this specification, although connection relation of the transistor is described assuming that the source and the drain are fixed in some cases for convenience, actually, the names of the source and the drain interchange with each other depending on the relation of the potentials.

Configuration Example 1 of DC-DC Converter

Figure 1:
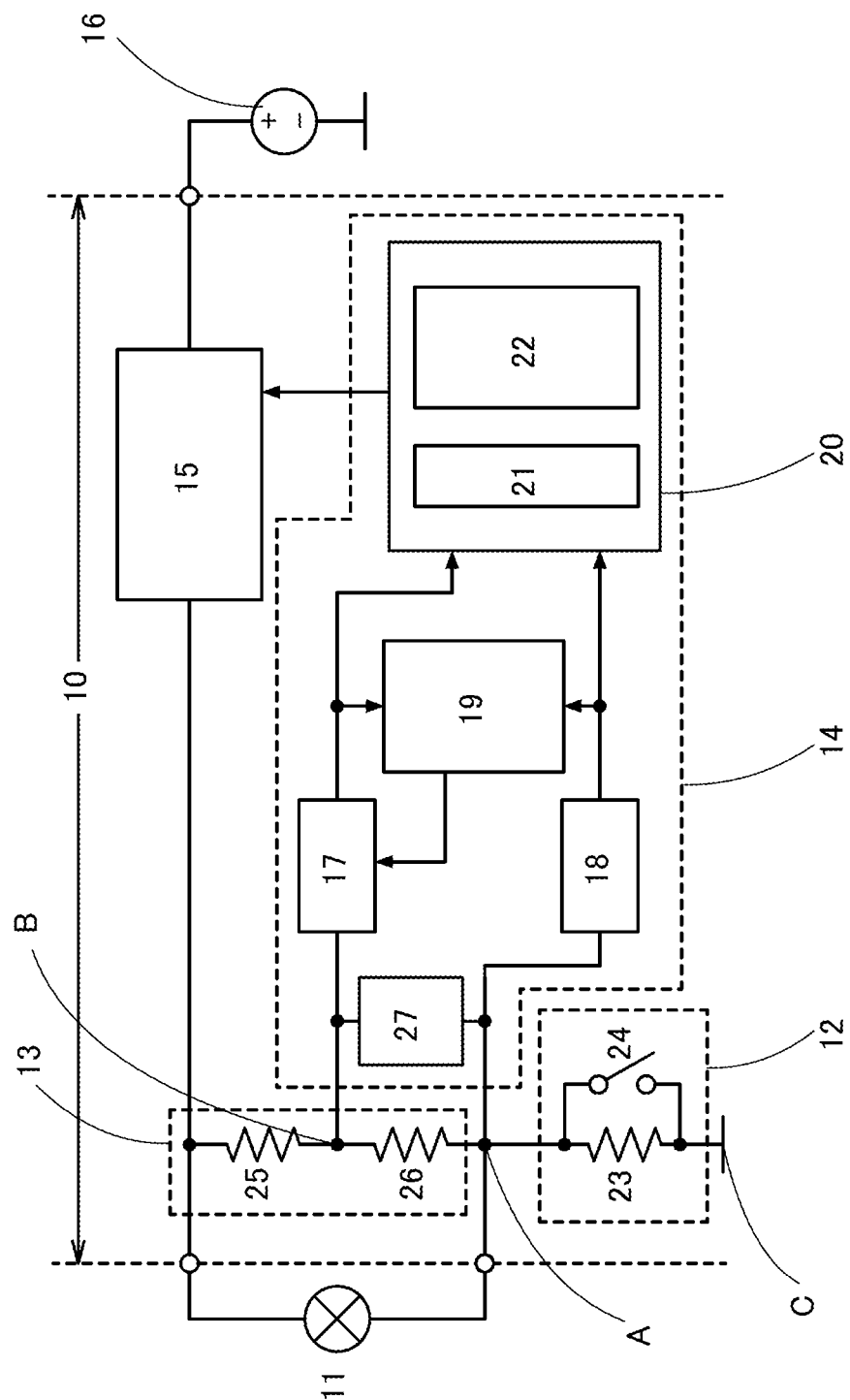
FIG. 1 illustrates a configuration of a DC-DC converter.

FIG. 1 is a block diagram illustrating a configuration example of a DC-DC converter of one embodiment of the present invention. Although the block diagram illustrates elements classified according to their functions in independent blocks, it might be practically difficult to completely separate the elements according to their functions and, in some cases, one element might be involved in a plurality of functions.

A DC-DC converter 10 illustrated in FIG. 1 includes a current detection circuit 12, a voltage detection circuit 13, a control circuit 14, and a power conversion circuit 15. The current detection circuit 12 has a function of generating a signal containing data on current flowing through a load 11 (in the following description, such a signal is referred to as a current signal). The voltage detection circuit 13 has a function of generating a signal containing data on voltage applied to the load 11 (in the following description, such a signal is referred to as a voltage signal).

The power conversion circuit 15 has a function of converting an input voltage that is supplied from a power source 16 such as a voltage source to the DC-DC converter 10 to an output voltage. The control circuit 14 has a function of controlling the level of the output voltage generated by the power conversion circuit 15.

In the DC-DC converter 10 illustrated in FIG. 1, the control circuit 14 includes a holding circuit 27, an amplifier circuit 17, an amplifier circuit 18, a correction circuit 19, and a driver circuit 20. The holding circuit 27 has a function of holding the voltage signal generated by the voltage detection circuit 13. The amplifier circuit 17 has a function of amplifying the voltage signal input through the holding circuit 27. The amplifier circuit 18 has a function of amplifying the current signal generated by the current detection circuit 12. The correction circuit 19 has a function of correcting the difference in electrical characteristics between the amplifier circuit 17 and the amplifier circuit 18. The driver circuit 20 has a function of controlling the level of the output voltage generated by the power conversion circuit 15 in accordance with the amplified voltage signal or the amplified current signal.

In the specific example in FIG. 1, the current detection circuit 12 in the DC-DC converter 10 includes a resistor 23 and a switch 24. The resistor 23 and the switch 24 are electrically connected in parallel, and the resistor 23 and the load 11 are electrically connected in series. Of a pair of terminals included in the resistor 23, the terminal electrically connected to the load 11 is referred to as a node A, and the other terminal is referred to as a node C. The potential of the node A when the switch 24 is off is determined depending on the current flowing through the resistor 23 if the resistance of the resistor 23 and the potential of the node C are fixed. A signal containing the potential of the node A is supplied to the amplifier circuit 18 as the current signal.

Moreover, in the example in FIG. 1, the voltage detection circuit 13 in the DC-DC converter 10 includes a resistor 25 and a resistor 26. The resistor 25 and the resistor 26 are electrically connected in series. In addition, the resistors 25 and 26 and the load 11 are electrically connected in parallel. One of a pair of terminals included in the resistor 25 and one of a pair of terminals included in the resistor 26 are electrically connected, and these electrically connected terminals are referred to as a node B. The potential of the node B is determined depending on the voltage applied between the other terminal of the pair of terminals included in the resistor 25 and the other terminal of the pair of terminals included in the resistor 26 (corresponding to the node A). A signal containing the potential of the node B is supplied to the holding circuit 27 as the voltage signal. The potential of the node A and the potential of the node B are supplied to the holding circuit 27, and the difference in potential is held in the holding circuit 27.

Furthermore, in the DC-DC converter 10 illustrated in FIG. 1, the driver circuit 20 includes a selection circuit 21 and a modulation circuit 22. The selection circuit 21 has a function of selecting either the voltage signal amplified by the amplifier circuit 17 or the current signal amplified by the amplifier circuit 18. The modulation circuit 22 has a function of generating a signal for controlling the level of the output voltage generated in the power conversion circuit 15 in accordance with the voltage signal or the current signal selected by the selection circuit 21.

Operation Example 1 of DC-DC Converter

Next, an operation example of the DC-DC converter 10 illustrated in FIG. 1 is described.

In a first period, the DC-DC converter 10 of one embodiment of the present invention performs both detection of the current signal and detection of the voltage signal. Specifically, the switch 24 in the current detection circuit 12 is turned off so that the current flowing through the load 11 can run through the node A and the resistor 23. Assuming that a predetermined potential such as a ground potential is supplied to the node C, the potential of the node A is determined depending on the current flowing through the resistor 23. The current signal containing the above-described potential of the node A is supplied to the amplifier circuit 18. The current signal amplified by the amplifier circuit 18 is supplied to the driver circuit 20.

In the voltage detection circuit 13, an output voltage is supplied to the load 11, and then the voltage applied to the load 11 is applied between the other terminal included in the resistor 25 and the other terminal included in the resistor 26 (node A). Accordingly, the potential of the node B is determined depending on the voltage applied to the load 11 and the ratio between the resistance of the resistor 25 and the resistance of the resistor 26. The signal containing the potential of the node B is supplied to the holding circuit 27 as the voltage signal. Furthermore, the potential of the node A is also supplied to the holding circuit 27.

In the driver circuit 20, the current signal from the amplifier circuit 18 is supplied by the selection circuit 21 to the modulation circuit 22. The modulation circuit 22 generates, using the current signal, the signal for controlling the level of the output voltage generated in the power conversion circuit 15. Specifically, in the case where the current signal is higher than a predetermined level, the power conversion circuit 15 generates a signal that lowers the output voltage generated in the power conversion circuit 15. In the case where the current signal is lower than the predetermined level, the power conversion circuit 15 generates a signal that heightens the output voltage generated in the power conversion circuit 15.

The power conversion circuit 15 converts the voltage input from the power source 16 to the output voltage with the adjusted level, in accordance with the signal generated by the modulation circuit 22. The output voltage with the adjusted level is supplied to the load 11; consequently, the current supplied to the load 11 is also adjusted to a predetermined value.

The supply of the output voltage whose level is adjusted to the predetermined level to the load 11 causes the voltage applied to the load 11 to be applied between the other terminal included in the resistor 25 and the other terminal included in the resistor 26 (node A) in the voltage detection circuit 13. Then, the potential of the node B is redetermined in accordance with the voltage, so that the signal containing the potential of the node B is supplied to the holding circuit 27 as the voltage signal. The difference in potential between the potential of the voltage signal, that is, the potential of the node B and the potential of the node A is held in the holding circuit 27.

Note that it can be said that after the output voltage with the adjusted predetermined level is supplied to the load 11, the potential difference held in the holding circuit 27 has the value appropriate for adjusting the current supplied to the load 11 to a predetermined value.

In a second period, the correction circuit 19 corrects the difference in electrical characteristics between the amplifier circuit 17 and the amplifier circuit 18. Specifically, the current signal amplified by the amplifier circuit 18 is supplied to the correction circuit 19. The voltage signal held in the holding circuit 27 is amplified by the amplifier circuit 17. The amplified voltage signal is supplied to the correction circuit 19.

When the potential of the node B and the sum of the potential of the node A and the potential difference held in the holding circuit 27 are input to the amplifier circuit 17, the correction circuit 19 generates a signal for correcting electrical characteristics of the amplifier circuit 17 (in the following description, such a signal is referred to as a correction signal) so that the potential output from the amplifier circuit 17 is the same level as the potential of the current signal output from the amplifier circuit 18. The current value of the correction signal is determined by the difference in potential between the voltage signal input from the amplifier circuit 17 to the correction circuit 19 and the current signal input from the amplifier circuit 18 to the correction circuit 19. The correction circuit 19 has a function of holding the difference in potential between the voltage signal and the current signal so that the current value of the correction signal can be maintained even while the voltage signal and the current signal are not input to the correction circuit 19.

In the amplifier circuit 17, the potential of the output voltage signal is corrected in accordance with the correction signal generated by the correction circuit 19 and input to the amplifier circuit 17. As a result, as the difference in potential between the node A and the node B is closer to the potential difference held in the holding circuit 27, the potential of the voltage signal output from the amplifier circuit 17 is corrected so as to be closer to the potential of the current signal.

In the example illustrated in FIG. 1, the correction signal for correcting the potential of the voltage signal output from the amplifier circuit 17 is generated in the correction circuit 19. In one embodiment of the present invention, a correction signal for correcting the potential of the current signal output from the amplifier circuit 18 may be generated in the correction circuit 19. Alternatively, both the correction signal for correcting the potential of the voltage signal output from the amplifier circuit 17 and the correction signal for correcting the potential of the current signal output from the amplifier circuit 18 may be generated in the correction circuit 19.

In the second period, like the first period, the amplified current signal is supplied to the modulation circuit 22 by the selection circuit 21 included in the driver circuit 20. The modulation circuit 22 generates, using the current signal, the signal for controlling the level of the output voltage generated in the power conversion circuit 15. The power conversion circuit 15 converts the voltage input from the power source 16 to the output voltage with the adjusted level, in accordance with the signal generated by the modulation circuit 22. The output voltage with the adjusted level is supplied to the load 11; consequently, the current supplied to the load 11 is also adjusted to a predetermined value.

Next, in a third period, in the DC-DC converter 10 of one embodiment of the present invention, the level of the output voltage generated in the power conversion circuit 15 is adjusted using the voltage signal. Specifically, in the third period, the switch 24 in the current detection circuit 12 is turned on so that the potential of the node A can be as close to the predetermined potential such as a ground potential supplied to the node C as possible.

In the amplifier circuit 17, the potential difference between the node A and the node B held in the holding circuit 27 in the first period is regarded as the reference, and the amplifier circuit 17 amplifies the voltage signal containing the potential of the node B so that the potential difference between the node A and the node B in the third period is as close to the reference as possible.

Furthermore, in the third period, the voltage signal amplified by the amplifier circuit 17 is supplied to the modulation circuit 22 by the selection circuit 21 included in the driver circuit 20. The modulation circuit 22 generates, using the voltage signal, the signal for controlling the level of the output voltage generated in the power conversion circuit 15. The power conversion circuit 15 converts the voltage input from the power source 16 to the output voltage with the adjusted level, in accordance with the signal generated by the modulation circuit 22. The output voltage with the adjusted level is supplied to the load 11; consequently, the current supplied to the load 11 is adjusted to the value that is substantially equal to the value adjusted using the current signal in the first period.

In the DC-DC converter 10 of one embodiment of the present invention, the above-described operation consisting of the first to third periods can be repeated. In one embodiment of the present invention, by turning on the switch 24 in the third period, the current flowing through the resistor 23 can be prevented. Accordingly, power loss at the resistor 23 can be decreased, so that the DC-DC converter 10 can have improved power conversion efficiency.

In the DC-DC converter 10 of one embodiment of the present invention, a correction signal including data on the difference in electrical characteristics between the amplifier circuit 17 and the amplifier circuit 18 is input to the amplifier circuit 17 by the correction circuit 19; therefore, the potential of the voltage signal output from the amplifier circuit 17 can be corrected so as to be close to the potential of the current signal output form the amplifier circuit 18. Since the difference in electrical characteristics between the amplifier circuit 17 and the amplifier circuit 18 can be corrected, a change in the current flowing through the load 11 can be prevented when switching from the second period in which the output voltage of the power conversion circuit 15 is controlled using the current signal to the third period in which the output voltage of the power conversion circuit 15 is controlled using the voltage signal.

Configuration Example 2 of DC-DC Converter

Figure 2:
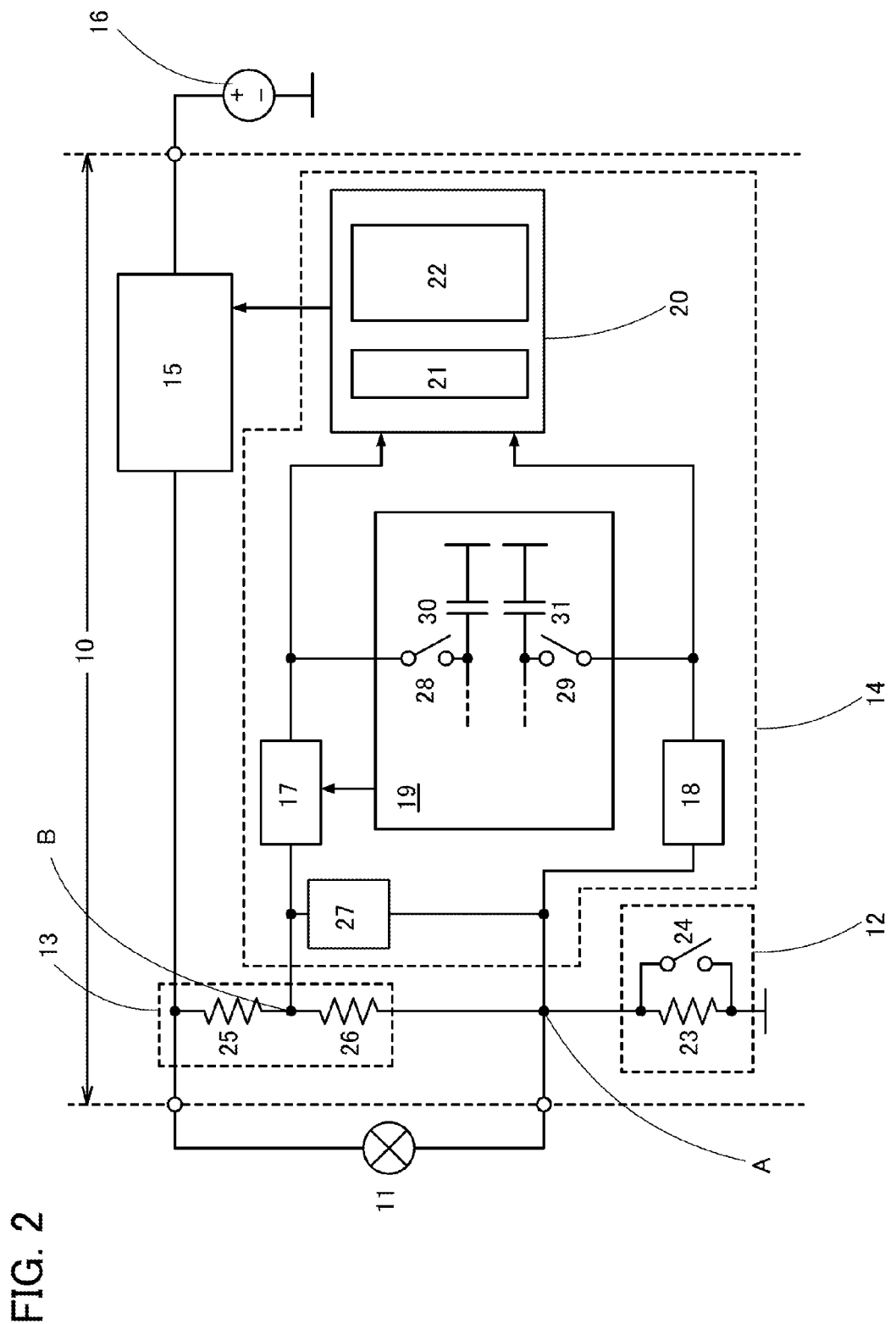
FIG. 2 illustrates a configuration of a DC-DC converter.

Next, an example of a detailed configuration of the correction circuit 19 in the DC-DC converter 10 of one embodiment of the present invention will be described. FIG. 2 is a block diagram illustrating a configuration example of a DC-DC converter of one embodiment of the present invention.

The DC-DC converter 10 illustrated in FIG. 2 is the same in structure as the DC-DC converter 10 illustrated in FIG. 1 in including the current detection circuit 12, the voltage detection circuit 13, the control circuit 14, and the power conversion circuit 15. Furthermore, the DC-DC converter 10 illustrated in FIG. 2 is the same in structure as the DC-DC converter 10 illustrated in FIG. 1 in that the control circuit 14 includes the holding circuit 27, the amplifier circuit 17, the amplifier circuit 18, the correction circuit 19, and the driver circuit 20.

Moreover, in the DC-DC converter 10 illustrated in FIG. 2, the correction circuit 19 includes a capacitor 30 having a function of holding the potential of the voltage signal output from the amplifier circuit 17, a switch 28 with which supply of the potential of the voltage signal to the capacitor 30 is controlled, a capacitor 31 having a function of holding the potential of the current signal output from the amplifier circuit 18, and a switch 29 with which supply of the potential of the current signal to the capacitor 31 is controlled.

Specifically, in the correction circuit 19 illustrated in FIG. 2, the switch 28 and the switch 29 are turned on in the second period. By this operation, the potential of the voltage signal output from the amplifier circuit 17 is supplied to the capacitor 30 through the switch 28, and the potential of the current signal output from the amplifier circuit 18 is supplied to the capacitor 31 through the switch 29. In the correction circuit 19 illustrated in FIG. 2, before the start of the third period, the switch 28 and the switch 29 are turned off. By this operation, the potential of the voltage signal and the potential of the current signal are held in the capacitor 30 and the capacitor 31, respectively.

In the correction circuit 19, a correction signal for correcting the potential of the voltage signal output from the amplifier circuit 17 is generated so as to reduce the difference in potential between the voltage signal and the current signal that are input to the correction circuit 19. The current of the correction signal is determined by the difference in potential between the voltage signal and the current signal that are input to the correction circuit 19. Since the potential of the voltage signal and the potential of the current signal are held in the capacitor 30 and the capacitor 31, respectively, in the correction circuit 19 in the third period in which input of the voltage signal and the current signal to the correction circuit 19 is not performed, the current of the correction signal can be maintained in the correction circuit 19.

Since the switch 28 and the switch 29 have functions of holding the potentials of the capacitor 30 and the capacitor 31, respectively, the switch 28 and the switch 29 are preferably transistors with extremely small off-state current. A transistor including a channel formation region in a film of a semiconductor having a wider band gap and a lower intrinsic carrier density than silicon can exhibit much lower off-state current than a normal transistor formed using a semiconductor such as silicon or germanium, and can be favorably used as the above-described transistors. Examples of such a semiconductor are an oxide semiconductor and gallium nitride that have a band gap more than twice as wide as that of silicon. By using such a transistor as the switch 28 and the switch 29, leakage of electric charges held in the capacitor 30 or the capacitor 31 can be prevented.

With this structure, the potential of the correction signal obtained in the second period can be maintained for a long period. As a result, the ratio of the third period to the first period can be increased, so that the DC-DC converter 10 can have improved power conversion efficiency.

Configuration Example 3 of DC-DC Converter

Next, an example of a detailed configuration of the DC-DC converter 10 illustrated in FIG. 1 will be described with reference to FIG. 3.

Figure 3:
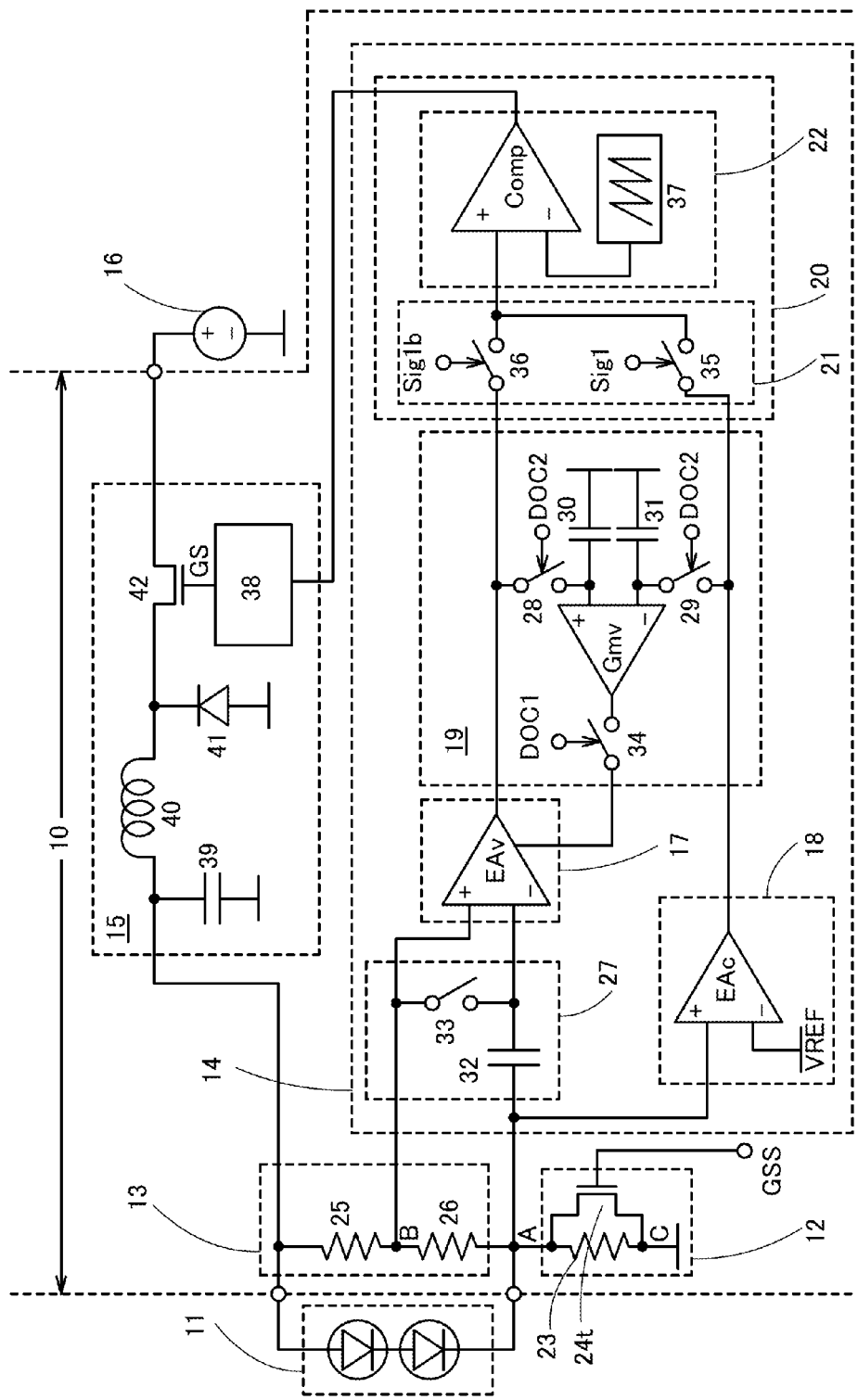
FIG. 3 illustrates a configuration of a DC-DC converter.

The DC-DC converter 10 illustrated in FIG. 3 includes the current detection circuit 12, the voltage detection circuit 13, the control circuit 14, and the power conversion circuit 15, like the DC-DC converter 10 illustrated in FIG. 1. Furthermore, in the DC-DC converter 10 illustrated in FIG. 3, the control circuit 14 includes the holding circuit 27, the amplifier circuit 17, the amplifier circuit 18, the correction circuit 19, and the driver circuit 20, as in the DC-DC converter 10 illustrated in FIG. 1.

Furthermore, in the DC-DC converter 10 illustrated in FIG. 3, the voltage detection circuit 13 includes the resistor 25 and the resistor 26 that are electrically connected in series, as in the DC-DC converter 10 illustrated in FIG. 1. Furthermore in the example illustrated in FIG. 3, the current detection circuit 12 includes the resistor 23 and a transistor 24t functioning as the switch 24 that are electrically connected in parallel. A signal GSS is supplied to a gate of the transistor 24t.

Moreover, the holding circuit 27 includes a capacitor 32 and a switch 33 in FIG. 3. The amplifier circuit 17 includes an error amplifier EAv, and the amplifier circuit 18 includes an error amplifier EAc.

Specifically, the node B of the voltage detection circuit 13 is electrically connected to a non-inverting input terminal (+) included in the error amplifier EAv. In other words, the voltage signal output from the voltage detection circuit 13 is supplied to the non-inverting input terminal (+) included in the error amplifier EAv. Furthermore, one electrode of the capacitor 32 is electrically connected to the node A. The other electrode of the capacitor 32 is electrically connected to an inverting input terminal (−) included in the error amplifier EAv. The switch 33 has a function of controlling the conduction between the non-inverting input terminal (+) and the inverting input terminal (−) that are included in the error amplifier EAv.

Moreover, specifically, the node A is electrically connected to a non-inverting input terminal (+) included in the error amplifier EAc, and an inverting input terminal (−) included in the error amplifier EAc is electrically connected to a wiring to which a potential VREF is supplied.

The DC-DC converter 10 illustrated in FIG. 3 is the same as the DC-DC converter 10 illustrated in FIG. 2 in that the correction circuit 19 includes the switch 28, the switch 29, the capacitor 30, and the capacitor 31. In addition, in the DC-DC converter 10 illustrated in FIG. 3, the correction circuit 19 includes a switch 34 and a Gm amplifier Gmv that determines the output current in accordance with the difference in two input potentials. The conduction of the switch 34 is controlled by a signal DOC1.

Specifically, an output terminal of the error amplifier EAv is electrically connected to one electrode of the capacitor 30 and a non-inverting input terminal (+) of the Gm amplifier Gmv through the switch 28. The other electrode of the capacitor 30 is electrically connected to a wiring to which a predetermined potential is supplied. An output terminal of the error amplifier EAc is electrically connected to one electrode of the capacitor 31 and an inverting input terminal (−) of the Gm amplifier Gmv through the switch 29. The other electrode of the capacitor 31 is electrically connected to a wiring to which a predetermined potential is supplied. An output terminal of the Gm amplifier Gmv is electrically connected to a power supply terminal of the error amplifier EAv through the switch 34. In other words, the current output from the output terminal of the Gm amplifier Gmv is supplied through the switch 34 to the power supply terminal of the error amplifier EAv as a correction signal.

In FIG. 3, the selection circuit 21 includes a switch 35 and a switch 36. The conduction of the switch 35 is controlled by a signal Sig1, and the conduction of the switch 36 is controlled by a signal Sig1b that has the opposite potential polarity to the signal Sig1. In FIG. 3, the modulation circuit 22 includes a comparator Comp and a triangular wave generation circuit 37. The triangular wave generation circuit 37 has a function of generating a signal having a potential waveform of a triangular wave or a sawtooth wave.

Specifically, the output terminal of the error amplifier EAv is electrically connected to a non-inverting input terminal (+) of the comparator Comp through the switch 36. Furthermore, the output terminal of the error amplifier EAc is electrically connected to the non-inverting input terminal (+) of the comparator Comp through the switch 35. The signal having a potential waveform of a triangular wave or a sawtooth wave generated by the triangular wave generation circuit 37 is input to an inverting input terminal (−) of the comparator Comp. A signal output from an output terminal of the comparator Comp is supplied to the power conversion circuit 15.

FIG. 3 illustrates a configuration example of the power conversion circuit 15 that has a function of stepping-down the input voltage. Specifically, the power conversion circuit 15 in FIG. 3 includes a buffer 38, a capacitor 39, an inductor 40, a diode 41, and a transistor 42. The signal supplied from the output terminal of the comparator Comp to the power conversion circuit 15 is supplied to a gate of the transistor 42 through the buffer 38 as a signal GS. The transistor 42 has a function of controlling the conduction between the power source 16 and a cathode of the diode 41 and between the power source 16 and one terminal of the inductor 40 in accordance with the signal GS. An anode of the diode 41 is electrically connected to a wiring to which a predetermined potential is supplied. The other terminal of the inductor 40 is electrically connected to one electrode of the capacitor 39, and the other electrode of the capacitor 39 is electrically connected to a wiring to which a predetermined potential is supplied.

The other terminal of the inductor 40 is electrically connected to the other terminal of the resistor 25 included in the voltage detection circuit 13 and the load 11.

In the power conversion circuit 15 illustrated in FIG. 3, electromotive force is generated in the inductor 40 when the transistor 42 is turned on. The voltage applied by the electromotive force and the inductance of the inductor 40 determine the current flowing through the inductor 40. Then, when the transistor 42 is turned off, electromotive force is generated in the inductor 40 in the direction that allows the above-described current to be maintained, that is, in the direction opposite to the direction of the electromotive force generated when the transistor 42 is on. As a result, a path of the current that runs through the diode 41 and the inductor 40 is formed, and the above-described current is maintained in the inductor 40. Accordingly, the potential of the other terminal of the inductor 40 is kept lower than the potential of the one terminal and held by the capacitor 39.

As the percentage of the period in which the transistor 42 is on is higher, the potential held in the capacitor 39 is higher and closer to the potential of the one terminal of the inductor 40. In addition, as the percentage of the period in which the transistor 42 is on is lower, the potential held in the capacitor 39 is lower.

The power conversion circuit 15 of one embodiment of the present invention may have a structure having a function of stepping up the input voltage.

Operation Example 2 of DC-DC Converter

Next, an operation example of the DC-DC converter 10 illustrated in FIG. 3 is described.

In a first period, the DC-DC converter 10 performs both detection of the current signal and detection of the voltage signal. Specifically, in the current detection circuit 12, the transistor 24t is turned off by controlling the potential of the signal GSS. By turning off the transistor 24t, the current flowing through the load 11 runs through the node A and the resistor 23, so that the potential of the node A becomes the potential corresponding to the current. Then, the current signal containing the potential of the node A is supplied to the non-inverting input terminal (+) of the error amplifier EAc. The error amplifier EAc amplifies the potential difference between the potential VREF supplied to the inverting input terminal (−) and the potential of the current signal supplied to the non-inverting input terminal (+). The current signal amplified in the error amplifier EAc is supplied to the selection circuit 21.

Meanwhile, in the voltage detection circuit 13, the voltage applied to the load 11 is supplied, and the potential of the node B becomes the potential corresponding to the voltage. The signal containing the potential of the node B is supplied to the holding circuit 27 as the voltage signal. The potential of the node A is supplied to the holding circuit 27. Then, in the holding circuit 27, the switch 33 is on, and the difference in potential between the node A and the node B is supplied to the capacitor 32.

By turning on the switch 33 in the holding circuit 27, the potential of the node B is supplied to both the non-inverting input terminal (+) and the inverting input terminal (−) of the error amplifier EAv.

In the first period, in the correction circuit 19, the switch 34 is turned off by controlling the potential of the signal DOC1, and the switch 28 and the switch 29 are turned off by controlling the potential of a signal DOC2.

In the selection circuit 21, the potential of the signal Sig1 and the potential of the signal Sig1b are controlled to turn on the switch 35 and turn off the switch 36. By this operation, the current signal from the error amplifier EAc is supplied to the non-inverting input terminal (+) of the comparator Comp through the switch 35. The signal having a potential waveform of a triangular wave or a sawtooth wave generated by the triangular wave generation circuit 37 is supplied to the inverting input terminal (−) of the comparator Comp. Then, in the comparator Comp, a periodic signal with a rectangular wave that has a pulse width varying in accordance with the potential applied to the non-inverting input terminal (+) is generated.

The power conversion circuit 15 converts the voltage input from the power source 16 to the output voltage with an adjusted predetermined level, in accordance with the signal generated by the comparator Comp. The output voltage with the adjusted level is supplied to the load 11; consequently, the current supplied to the load 11 is also adjusted to a predetermined value.

The supply of the output voltage with an adjusted predetermined level to the load 11 causes the voltage applied to the load 11 to be supplied again to the voltage detection circuit 13. In the voltage detection circuit 13, the potential of the node B becomes the potential corresponding to the supplied voltage. Then, in the holding circuit 27, the switch 33 is on, and the difference in potential between the node A and the node B is supplied to the capacitor 32.

In the holding circuit 27, after the first period is finished, the switch 33 is turned off and the difference in potential between the node A and the node B is held in the capacitor 32. It can be said that the difference in potential between the node A and the node B held in the capacitor 32 is the reference potential difference that is appropriate for adjusting the current supplied to the load 11 to a predetermined value. In the following description, this difference in potential is referred to as a potential difference V1.

Next, in a second period, as in the first period, the transistor 24t in the current detection circuit 12 is kept off by controlling the potential of the signal GSS. In the selection circuit 21, the potential of the signal Sig1 and the potential of the signal Sig1b are controlled to turn on the switch 35 and turn off the switch 36. By this operation, in the same manner as that of the first period, in the power conversion circuit 15, the input voltage from the power source 16 is converted into the output voltage with the adjusted predetermined level, in accordance with the current signal generated by the current detection circuit 12.

In the second period, in the correction circuit 19, the switch 34 is turned on by controlling the potential of the signal DOC1, and the switch 28 and the switch 29 are turned on by controlling the potential of the signal DOC2. By this operation, the current signal amplified by the error amplifier EAc is supplied to the inverting input terminal (−) of the Gm amplifier Gmv and the one electrode of the capacitor 31 through the switch 29. The potential of the current signal amplified in the error amplifier EAc is referred to as a potential Veac in the following description. It can be said that the potential Veac is the potential of the current signal that is appropriate for adjusting the current supplied to the load 11 to a predetermined value.

In the second period, in the holding circuit 27, the switch 33 is off, and the potential difference V1 between the node A and the node B obtained in the first period is held in the capacitor 32. Furthermore, since the potential of the node B is supplied to both the non-inverting input terminal (+) and the inverting input terminal (−) of the error amplifier EAv when the switch 33 in the holding circuit 27 is on in the first period, immediately after the switch 33 is turned off in the second period, the difference in potential between the non-inverting input terminal (+) and the inverting input terminal (−) of the error amplifier EAv is close to zero. The potential of the output terminal of the error amplifier EAv is supplied to the non-inverting input terminal (+) of the Gm amplifier Gmv and the one electrode of the capacitor 30 through the switch 28.

In the Gm amplifier Gmv, the output current from the output terminal is determined depending on the difference in potential between the non-inverting input terminal (+) and the inverting input terminal (−). The output current is supplied to the power supply terminal of the error amplifier EAv through the switch 34. Upon the supply of the current to the power supply terminal of the error amplifier EAv, the error amplifier EAv performs correction so that the potential of the output terminal is close to the potential Veac of the current signal output from the error amplifier EAc. In other words, when the difference in potential between the non-inverting input terminal (+) and the inverting input terminal (−) is close to zero, the error amplifier EAv performs correction so as to output the voltage signal having the potential Veac.

When the potential of the output terminal of the error amplifier EAv is close to the potential Veac, the amount of change in the potential of the one electrode of the capacitor 30 also converges to zero.

After the second period is finished, the switch 28 and the switch 29 are turned off by controlling the potential of the signal DOC2. By this operation, the difference in potential between the non-inverting input terminal (+) and the inverting input terminal (−) of the Gm amplifier Gmv at the time when the amount of change in the potential of the one electrode of the capacitor 30 has converged to zero is held in the capacitor 30 and the capacitor 31.

Next in a third period, the transistor 24t is turned on by controlling the potential of the signal GSS in the current detection circuit 12. By this operation, the potential of the node A becomes substantially equal to the predetermined potential, such as a ground potential, supplied to the other terminal of the resistor 23 (node C). In the holding circuit 27, the switch 33 keeps in the off state. Accordingly, although the potential of the node A changes to be substantially equal to the predetermined potential such as a ground potential, the potential difference V1 between the inverting input terminal (−) of the error amplifier EAv and the node A is held in the capacitor 32.

The potential of the node B in the voltage detection circuit 13 is supplied to the non-inverting input terminal (+) of the error amplifier EAv. Accordingly, in the third period, the sum of the reference potential difference V1 and the potential of the node A is supplied to the inverting input terminal (−) of the error amplifier EAv, and the sum of the actual potential difference between the node A and the node B and the potential of the node A is supplied to the non-inverting input terminal (+) of the error amplifier EAv. In other words, in the error amplifier EAv, the difference in potential between the inverting input terminal (−) and the non-inverting input terminal (+) corresponds to the difference between the actual potential difference between the node A and the node B and the reference potential difference V.

In the correction circuit 19, the switch 34 is kept in the on state by controlling the potential of the signal DOC1, and the switch 28 and the switch 29 are turned off by controlling the potential of the signal DOC2. By this operation, the difference in potential between the non-inverting input terminal (+) and the inverting input terminal (−) of the Gm amplifier Gmv is held in the capacitor 30 and the capacitor 31. Accordingly, when the difference in potential between the non-inverting input terminal (+) and the inverting input terminal (−) is close to zero, the error amplifier EAv keeps in the state of performing correction so as to output the voltage signal having the potential close to the potential Veac.

Note that the potential difference V1 corresponds to the reference potential difference between the node A and the node B that is appropriate for adjusting the current supplied to the load 11 to a predetermined value. Thus, in the third period, when a difference occurs between the actual potential difference between the node A and the node B and the reference potential difference V1, the potential of the output terminal of the error amplifier EAv changes with reference to the potential close to the potential Veac, in order to reduce the difference.

In the selection circuit 21, the potential of the signal Sig1 and the potential of the signal Sig1b are controlled to turn off the switch 35 and turn on the switch 36. By this operation, in the power conversion circuit 15, the input voltage from the power source 16 is converted into the output voltage with an adjusted predetermined level, in accordance with the voltage signal containing the potential of the output terminal of the error amplifier EAv. The output voltage with the adjusted level is supplied to the load 11; consequently, the current supplied to the load 11 is adjusted to the value that is substantially equal to the value adjusted by the current signal in the first period.

In the DC-DC converter 10 of one embodiment of the present invention, the above-described operation consisting of the first to third periods can be repeated. In one embodiment of the present invention, by turning on the transistor 24t in the third period, the current flowing through the resistor 23 can be prevented. Accordingly, power loss at the resistor 23 can be decreased, so that the DC-DC converter 10 can have improved power conversion efficiency.

In the DC-DC converter 10 of one embodiment of the present invention, a correction signal including data on the difference in electrical characteristics between the amplifier circuit 17 and the amplifier circuit 18 is input to the amplifier circuit 17 by the correction circuit 19; therefore, the potential of the voltage signal output from the amplifier circuit 17 can be corrected so as to be close to the potential of the current signal output form the amplifier circuit 18. Since the difference in electrical characteristics between the amplifier circuit 17 and the amplifier circuit 18 can be corrected, a change in the current flowing through the load 11 can be prevented when switching from the second period in which the output voltage of the power conversion circuit 15 is controlled using the current signal to the third period in which the output voltage of the power conversion circuit 15 is controlled using the voltage signal.

Although the modulation circuit 22 outputs a signal having a potential waveform of pulse width modulation control (PWM) in the configuration example in FIG. 3, the modulation circuit 22 in a DC-DC converter of one embodiment of the present invention may output a signal having a potential waveform of pulse frequency modulation control (PFM).

Configuration Example of Driver Circuit

Next, a configuration example of the driver circuit 20, which is different from that illustrated in FIG. 3, will be described with reference to FIG. 4.

Figure 4:
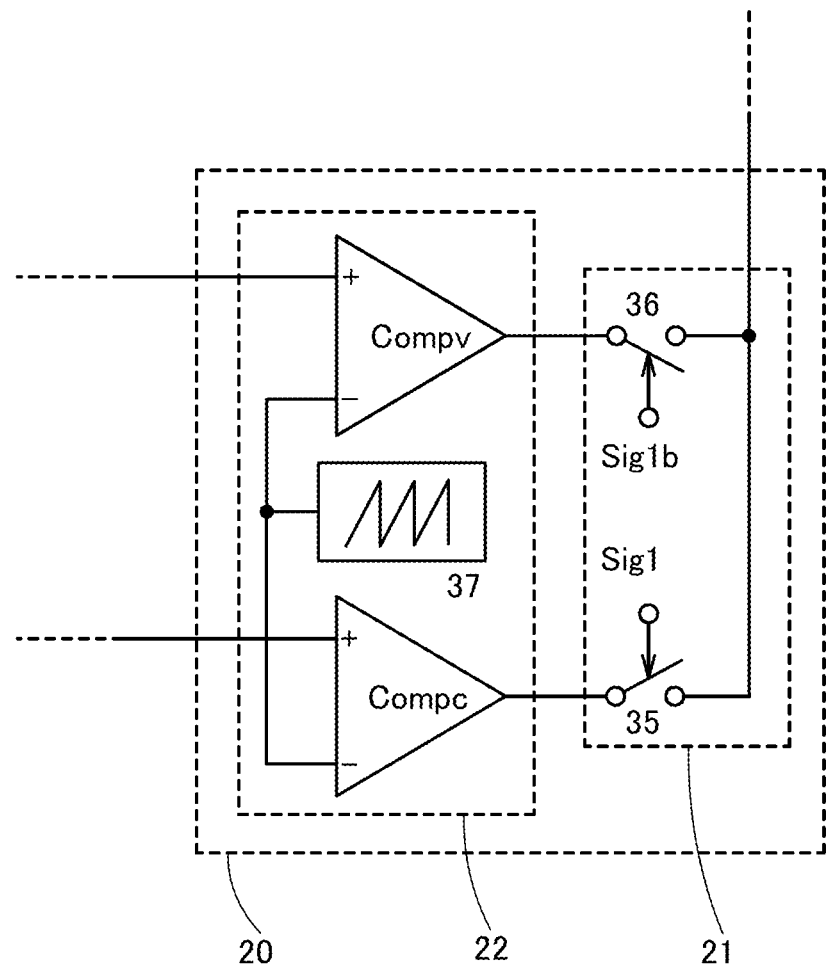
FIG. 4 illustrates a configuration of a driver circuit.

In the driver circuit 20 illustrated in FIG. 4, the modulation circuit 22 includes a comparator Compv, a comparator Compc, and the triangular wave generation circuit 37. The selection circuit 21 includes the switch 35 and the switch 36. The conduction of the switch 35 is controlled by the signal Sig1, and the conduction of the switch 36 is controlled by the signal Sig1b that has the opposite potential polarity to the signal Sig1.

In the driver circuit 20 illustrated in FIG. 4, the voltage signal output from the amplifier circuit 17 is supplied to a non-inverting input terminal (+) of the comparator Compv. Furthermore, the current signal output from the amplifier circuit 18 is supplied to a non-inverting input terminal (+) of the comparator Compc. The signal having a potential waveform of a triangular wave or a sawtooth wave generated by the triangular wave generation circuit 37 is supplied to inverting input terminals (−) of the comparators Compv and Compc. A signal output from an output terminal of the comparator Compv is supplied to the power conversion circuit 15 through the switch 36. A signal output from an output terminal of the comparator Compc is supplied to the power conversion circuit 15 through the switch 35.

Connection Structure Example of Correction Circuit and Error Amplifier EAv

Next, an example of the connection structure between the error amplifier EAv and the correction circuit 19 in the DC- DC converter 10 illustrated in FIG. 3 will be described with reference to FIG. 5. The error amplifier EAv illustrated in FIG. 5 includes a Gm amplifier Gmva and an amplifier Amp. The correction circuit 19 includes a transistor 28*t* functioning as the switch 28, a transistor 29*t* functioning as the switch 29, the capacitor 30, the capacitor 31, the Gm amplifier Gmv, and a transistor 34*t*1 and a transistor 34*t*2 functioning as the switch 34.

A voltage signal INP from the voltage detection circuit 13 is supplied to a non-inverting input terminal (+) of the Gm amplifier Gmva, and a reference voltage signal INN held in the holding circuit 27 is supplied to an inverting input terminal (−) of the Gm amplifier Gmva. Specifically, the non-inverting input terminal (+) of the Gm amplifier Gmva is electrically connected to the node B of the voltage detection circuit 13, and the inverting input terminal (−) of the Gm amplifier Gmva is electrically connected to the other electrode of the capacitor 32.

The Gm amplifier Gmva controls the difference between currents output from a pair of output terminals in accordance with the difference between the potential of the voltage signal INP supplied to the non-inverting input terminal (+) and the potential of the voltage signal INN supplied to the inverting input terminal (−). Specifically, in the Gm amplifier Gmva, as the difference between the potential of the voltage signal INP and the potential of the voltage signal INN is larger, the difference between currents output from the pair of output terminals is larger; and as the difference between the potential of the voltage signal INP and the potential of the voltage signal INN is smaller, the difference between currents output from the pair of output terminals is smaller.

The currents output from the pair of output terminals of the Gm amplifier Gmva are supplied to a non-inverting input terminal (+) and an inverting input terminal (−) of the amplifier Amp.

The Gm amplifier Gmv controls the difference between currents output from a pair of output terminals in accordance with the difference between the potential of the output terminal of the amplifier Amp supplied to the non-inverting input terminal (+) through the transistor 28*t* and the potential Veac supplied to the inverting input terminal (−) through the transistor 29*t*. Specifically, in the Gm amplifier Gmv, as the difference between the potential of the output terminal of the amplifier Amp and the potential Veac is larger, the difference between currents output from the pair of output terminals is larger; and as the difference between the potential of the output terminal of the amplifier Amp and the potential Veac is smaller, the difference between currents output from the pair of output terminals is smaller.

The currents output from the pair of output terminals of the Gm amplifier Gmv are supplied to the non-inverting input terminal (+) and the inverting input terminal (−) of the amplifier Amp through the transistor 34*t*1 and the transistor 34*t*2 included in the switch 34, respectively, as a correction signal.

The amplifier controls the potential output from the output terminal (OUT) in accordance with the difference in currents input to the non-inverting input terminal (+) and the inverting input terminal (−). Specifically, in the amplifier Amp, as the difference between the currents input to the non-inverting input terminal (+) and the inverting input terminal (−) is larger, the difference between the potential of the output terminal and the potential Veac is larger; and as the difference between the currents input to the non-inverting input terminal (+) and the inverting input terminal (−) is smaller, the difference between the potential of the output terminal and the potential Veac is smaller.

The potential of the voltage signal output from the error amplifier EAv is corrected by the correction circuit 19; thus, the level of the output voltage of the power conversion circuit 15 is controlled in the DC-DC converter 10 illustrated in FIG. 3. Consequently, the difference between the potentials of the voltage signal INP and the voltage signal INN that are input to the error amplifier EAv is corrected to be small.

Figure 5:
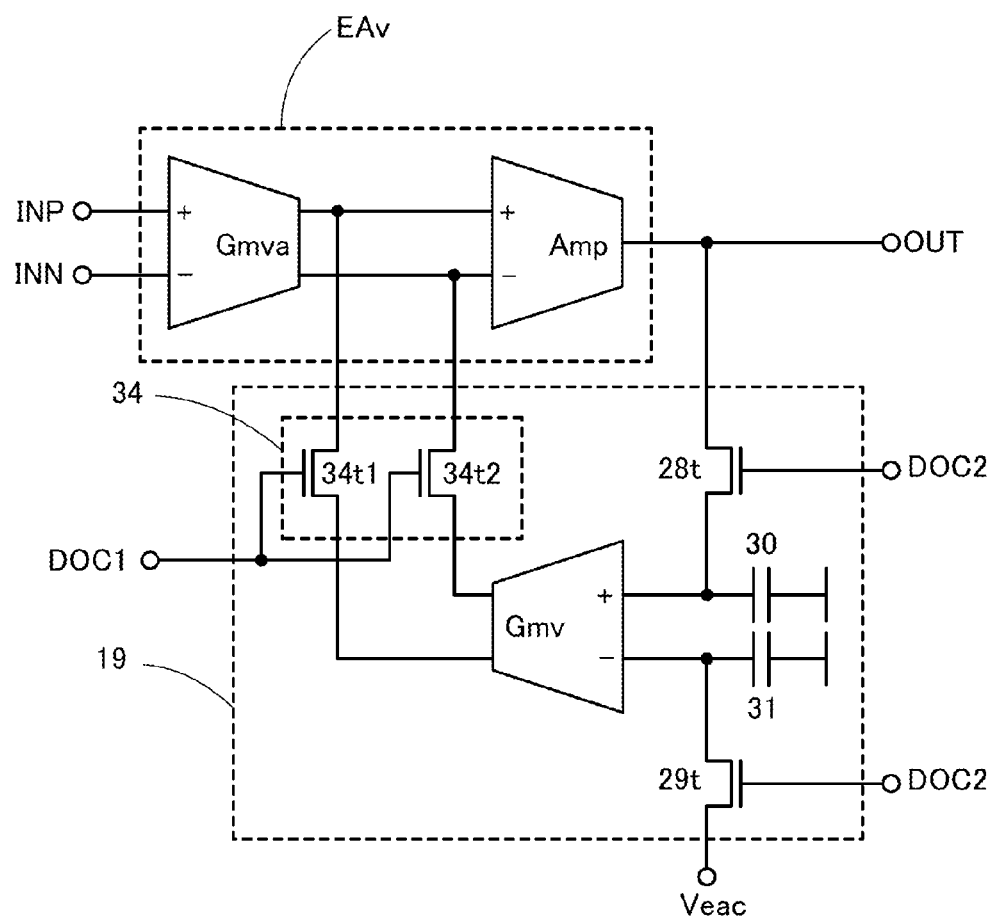
FIG. 5 illustrates a connection structure of an error amplifier EAv and a correction circuit.
Figure 6:
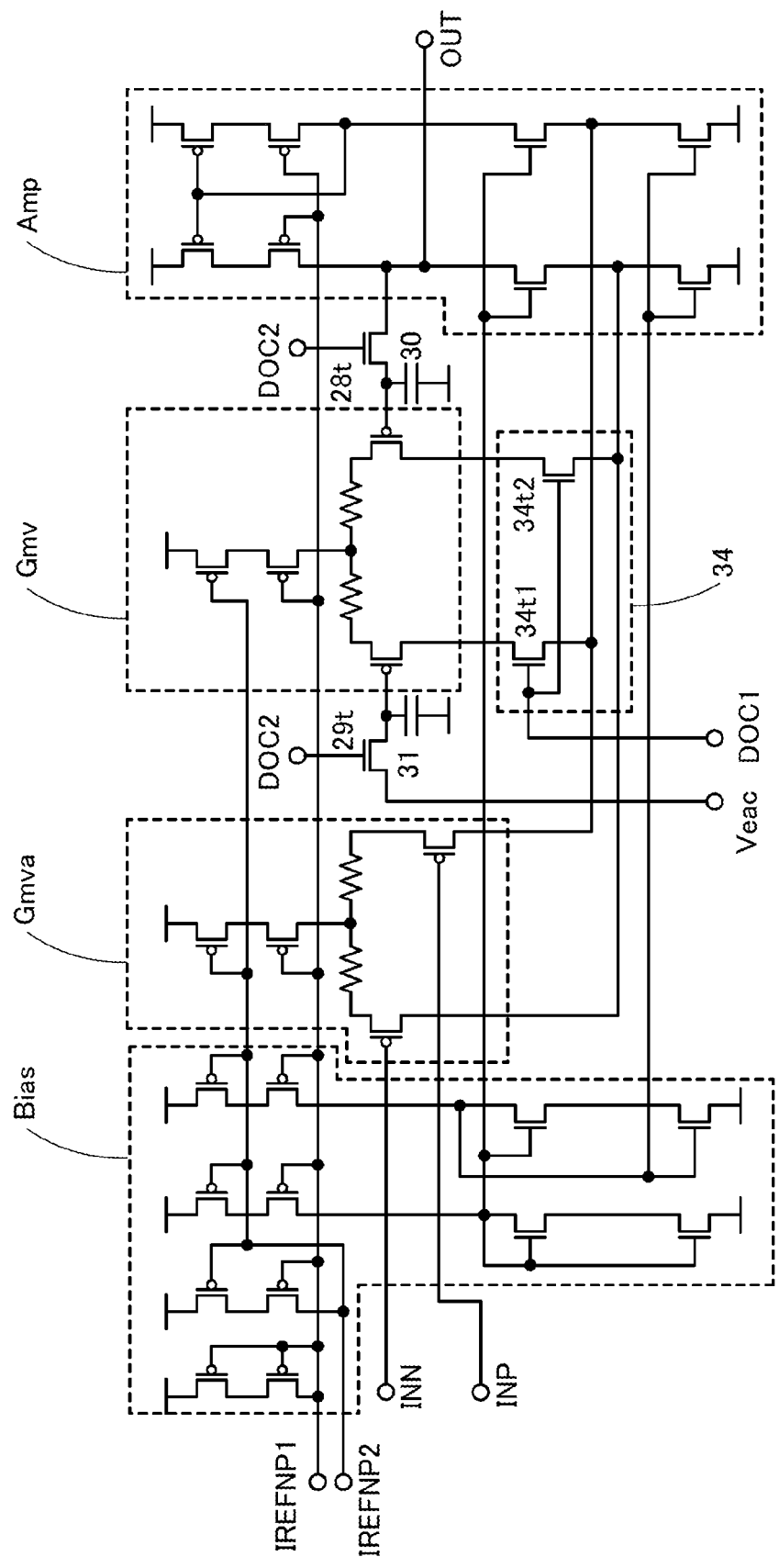
FIG. 6 illustrates a specific configuration example of a Gm amplifier Gmva, an amplifier Amp, and a Gm amplifier Gmv, and an example of a connection structure of the Gm amplifier Gmva, the amplifier Amp, the Gm amplifier Gmv, a transistor 28$t$, a transistor 29$t$, a capacitor 30, a capacitor 31, a transistor 34$t$1, and a transistor 34$t$2.

FIG. 6 illustrates a specific configuration example of the Gm amplifier Gmva, the amplifier Amp, and the Gm amplifier Gmv that are illustrated in FIG. 5, and an example of the connection structure between the Gm amplifier Gmva, the amplifier Amp, and the Gm amplifier Gmv and the transistor 28*t*, the transistor 29*t*, the capacitor 30, the capacitor 31, the transistor 34*t*1, and the transistor 34*t*2. FIG. 6 also illustrates a configuration example of a bias circuit Bias that controls supply of a bias voltage to a current source included in each of the Gm amplifier Gmva, the amplifier Amp, and the Gm amplifier Gmv. The bias voltage output from the bias circuit Bias is controlled by a signal IREFNP1 and a signal IREFNP2.

Configuration Example 4 of DC-DC Converter

Next, a configuration example of a DC-DC converter of one embodiment of the present invention, which is different from that of the DC-DC converter 10 illustrated in FIG. 1, will be described.

Figure 7:
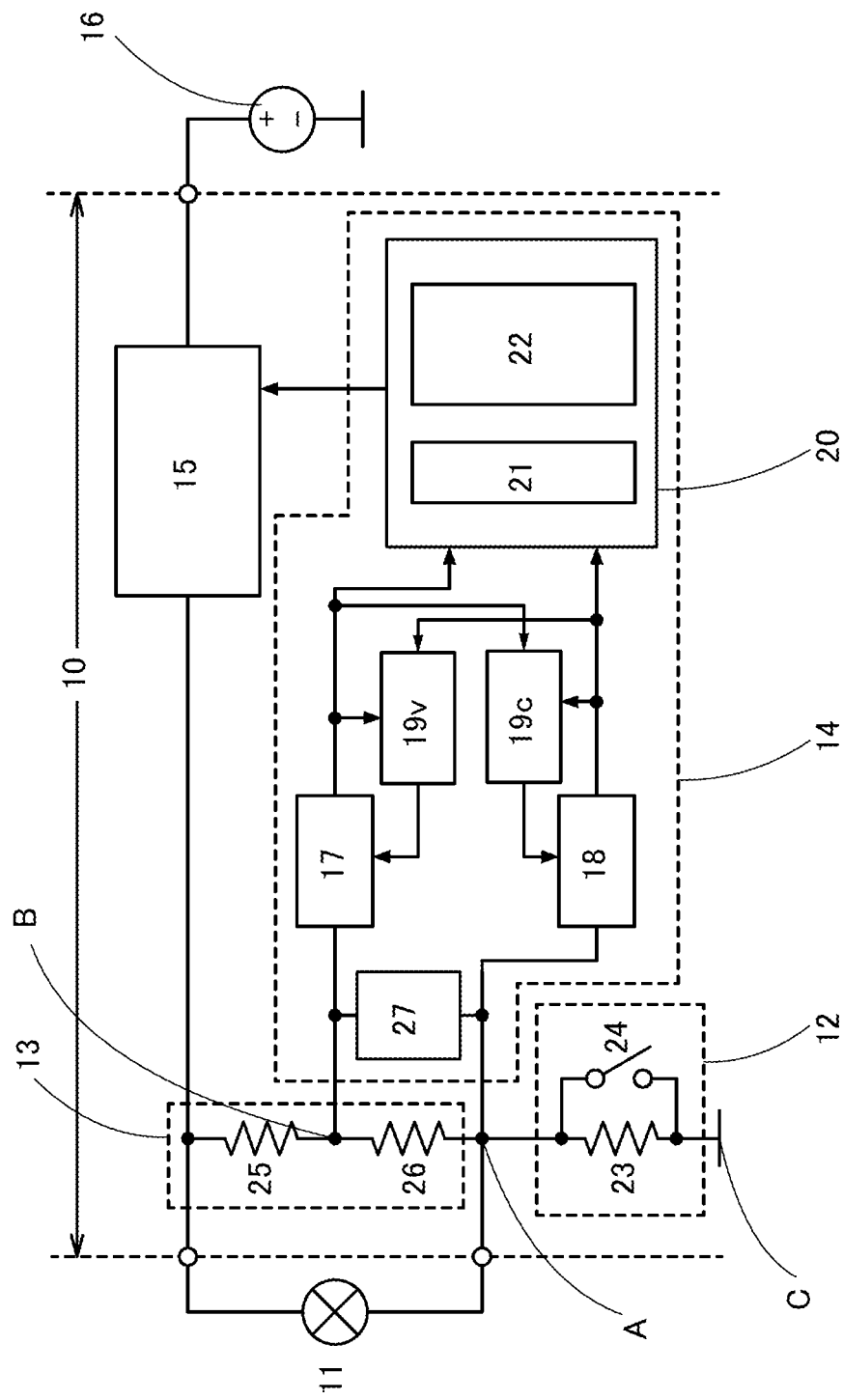
FIG. 7 illustrates a configuration of a DC-DC converter.

FIG. 7 illustrates a configuration example of the DC-DC converter 10 of one embodiment of the present invention. The DC-DC converter 10 illustrated in FIG. 7 is different in structure from the DC-DC converter 10 illustrated in FIG. 1 in including, in the control circuit 14, a correction circuit 19*v* which corrects the potential of the voltage signal output from the amplifier circuit 17 and a correction circuit 19*c* which corrects the potential of the current signal output from the amplifier circuit 18.

Specifically, in the DC-DC converter 10 illustrated in FIG. 7, the voltage signal output from the amplifier circuit 17 is input to the correction circuit 19*v* and the correction circuit 19*c*. In addition, the current signal output from the amplifier circuit 18 is input to the correction circuit 19*v* and the correction circuit 19*c*. The correction circuit 19*v* generates a correction signal for correcting the potential of the voltage signal output from the amplifier circuit 17 so that the potential of the voltage signal output from the amplifier circuit 17 is close to the potential of the current signal output from the amplifier circuit 18. The correction signal generated in the correction circuit 19*v* is supplied to the amplifier circuit 17. Furthermore, the correction circuit 19*c* generates a correction signal for correcting the potential of the current signal output from the amplifier circuit 18 so that the potential of the current signal output from the amplifier circuit 18 is close to the potential of the voltage signal output from the amplifier circuit 17. The correction signal generated in the correction circuit 19*c* is supplied to the amplifier circuit 18.

In the DC-DC converter 10 illustrated in FIG. 7, the potential of the voltage signal output from the amplifier circuit 17 is controlled by the correction circuit 19*v* in the period in which the output voltage of the power conversion circuit 15 is controlled using the current signal. Furthermore, the potential of the current signal output from the amplifier circuit 18 is controlled by the correction circuit 19*c* in the period in which the output voltage of the power conversion circuit 15 is controlled using the voltage signal. In this way, a variation in the output voltage of the power conversion circuit 15 at the time when the period is switched can be prevented.

Figure 8:
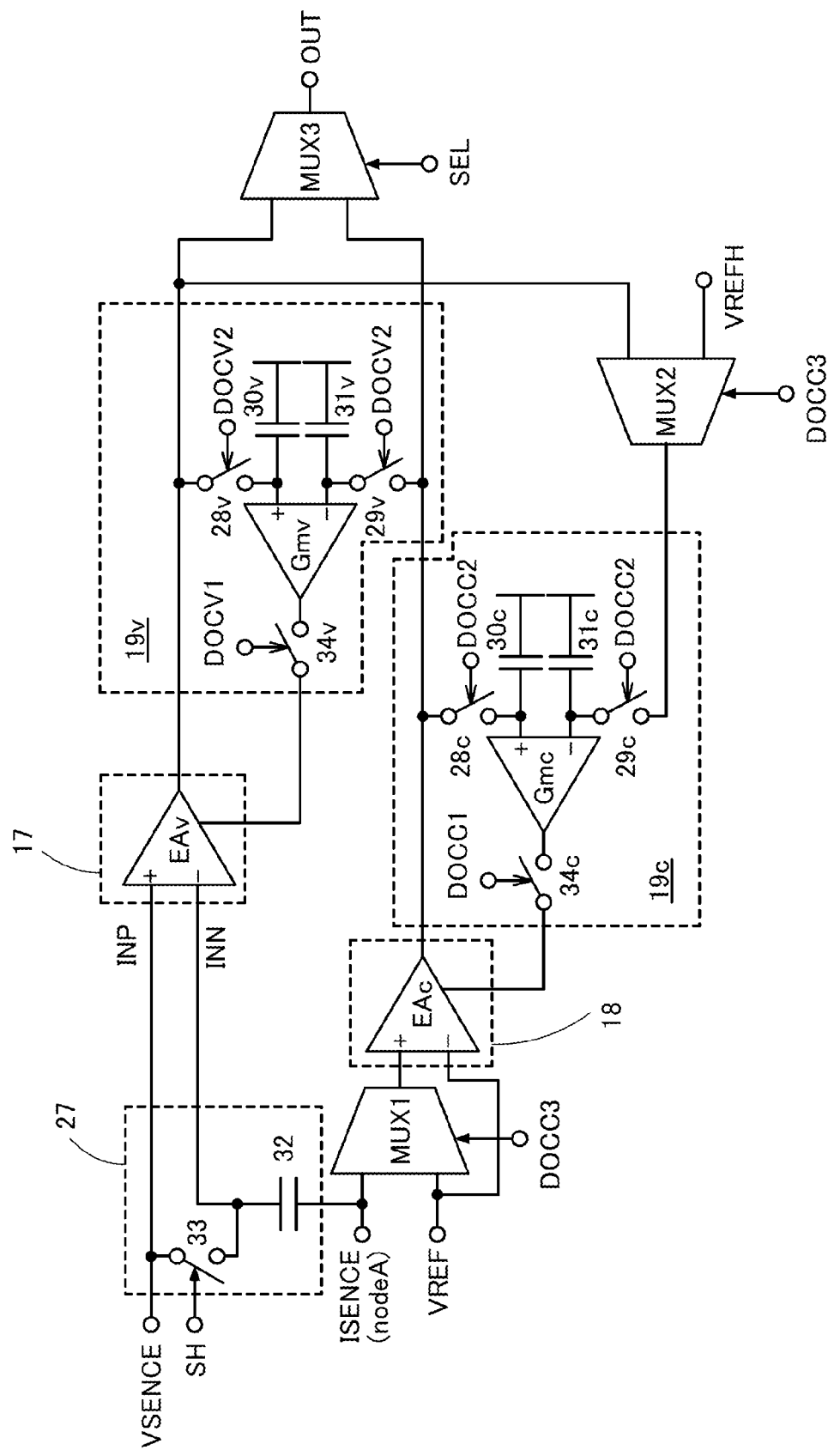
FIG. 8 illustrates an example of a connection structure of a holding circuit 27, an amplifier circuit 17, an amplifier circuit 18, a correction circuit 19$v$, and a correction circuit 19$c$.

FIG. 8 illustrates an example of the connection structure of the holding circuit 27, the amplifier circuit 17, the amplifier circuit 18, the correction circuit 19v, and the correction circuit 19c which are included in the DC-DC converter 10 illustrated in FIG. 7. FIG. 8 illustrates an example in the case where multiplexers MUX1 to MUX3 are provided in the DC-DC converter 10.

In FIG. 8, the correction circuit 19v includes a capacitor 30v having a function of holding the potential of the voltage signal output from the amplifier circuit 17, a switch 28v with which supply of the potential of the voltage signal to the capacitor 30v is controlled, a capacitor 31v having a function of holding the potential of the current signal output from the amplifier circuit 18, a switch 29v with which supply of the potential of the current signal to the capacitor 31v is controlled, the Gm amplifier Gmv that determines the value of the output current in accordance with the difference between two input potentials, and a switch 34v with which supply of the correction signal output from the Gm amplifier Gmv to the power supply terminal of the error amplifier EAv is controlled. The conduction of the switch 28v and the switch 29v is controlled by a signal DOCV2. The conduction of the switch 34 is controlled by a signal DOCV1.

Moreover, the correction circuit 19c includes a capacitor 30c having a function of holding the potential of the current signal output from the amplifier circuit 18, a switch 28c with which supply of the potential of the current signal to the capacitor 30c is controlled, a capacitor 31c having a function of holding the potential of the voltage signal output from the multiplexer MUX2, a switch 29c with which supply of the potential of the voltage signal to the capacitor 31c is controlled, a Gm amplifier Gmc that determines the output current in accordance with the difference between two input potentials, and a switch 34c with which supply of the correction signal output from the Gm amplifier Gmc to a power supply terminal of the error amplifier EAc is controlled. The conduction of the switch 28c and the switch 29c is controlled by a signal DOCC2. The conduction of the switch 34 is controlled by a signal DOCC1.

Furthermore, the multiplexer MUX1 has a function of selecting either a potential ISENCE at the node A in the DC-DC converter 10 illustrated in FIG. 7 or the potential VREF in accordance with a signal DOCC3, and supplying the selected potential to the non-inverting input terminal (+) of the error amplifier EAc included in the amplifier circuit 18.

The multiplexer MUX2 has a function of selecting either a potential VREFH or the potential of the voltage signal output from the amplifier circuit 17 in accordance with the signal DOCC3. The potential selected by the multiplexer MUX2 is supplied to an inverting input terminal (−) of the Gm amplifier Gmc and one electrode of the capacitor 31c through the switch 29c.

The multiplexer MUX3 has a function of selecting either the potential of the voltage signal output from the amplifier circuit 17 or the potential of the current signal output from the amplifier circuit 18 in accordance with a signal SEL, and outputting the selected potential to an output terminal OUT.

In the holding circuit 27, the conduction of the switch 33 is controlled by a signal SH. A potential VSENCE at the node B in the DC-DC converter 10 illustrated in FIG. 7 is supplied to the non-inverting input terminal (+) of the error amplifier EAv included in the amplifier circuit 17 as the voltage signal INP. The potential VSENCE at the node B is supplied to the inverting input terminal (−) of the error amplifier EAv through the switch 33 as the voltage signal INN.

Figure 9:
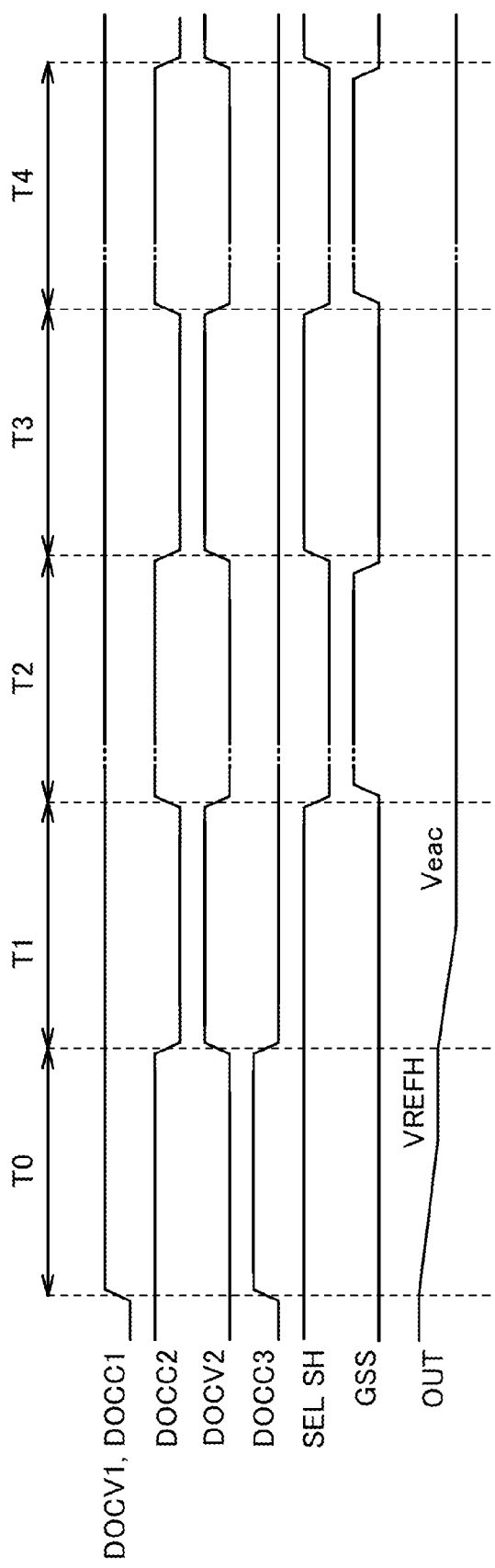
FIG. 9 is a timing chart of various potentials used in operation of a DC-DC converter.

FIG. 9 is an example of a timing chart showing various potentials used in operation of the DC-DC converter 10 illustrated in FIG. 7 and FIG. 8.

In a period T0, the potentials of the signal DOCV1 and the signal DOCC1 are brought into the high level, so that the switch 34v and the switch 34c are turned on. In addition, the potential of the signal DOCC3 is brought into the high level, so that the potential VREF is selected in the multiplexer MUX1. Then, the selected potential VREF is supplied to the non-inverting input terminal (+) of the error amplifier EAc, so that the potential of the output terminal of the error amplifier EAc is initialized. Furthermore, owing to the high level of the potential of the signal DOCC3, the potential VREFH is selected in the multiplexer MUX2.

In the period T0, since the potential of the signal DOCC2 is at the high level, the switch 28c and the switch 29c are on. The potential output from the error amplifier EAc is supplied to a non-inverting input terminal (+) of the Gm amplifier Gmc and one electrode of the capacitor 30c through the switch 28c. In addition, the potential VREFH selected by the multiplexer MUX2 is supplied to the inverting input terminal (−) of the Gm amplifier Gmc and one electrode of the capacitor 31c through the switch 29c.

The Gm amplifier Gmc generates a correction signal for making the potential output from the error amplifier EAc close to the potential VREFH. The generated correction signal is supplied to the power supply terminal of the error amplifier EAc through the switch 34c.

Furthermore, in the period T0, since the potential of the signal DOCV2 is at the low level, the switch 28v and the switch 29v are off. The potential of the signal SH is at the high level, so that the switch 33 is on, and the potential VSENCE is supplied to the non-inverting input terminal (+) and the inverting input terminal (−) of the error amplifier EAv as the signal INP and the signal INN, respectively.

In the period T0, since the potential of the signal SEL is at the high level, the multiplexer MUX3 selects the potential output from the error amplifier EAc. The selected potential is output from the output terminal OUT. Note that the potential output from the error amplifier EAc is corrected so as to gradually come close to the potential VREFH with the passage of time from the start of the period T0. Accordingly, the potential output from the output terminal OUT also gradually changes toward the potential VREFH with the passage of time from the start of the period T0.

The potential VREFH output from the error amplifier EAc is supplied to the non-inverting input terminal (+) of the Gm amplifier Gmc and the one electrode of the capacitor 30c through the switch 28c.

In a period T1, the potentials of the signal DOCV1 and the signal DOCC1 remain at the high level, so that the switch 34v and the switch 34c remain on. The potential of the signal DOCC3 is brought into the low level, so that the potential ISENCE at the node A is selected in the multiplexer MUX1. Then, the selected potential ISENCE is supplied to the non-inverting input terminal (+) of the error amplifier EAc as the current signal, so that the current signal is amplified in the error amplifier EAc.

In the period T1, the potential of the signal DOCC2 is brought into the low level, so that the switch 28c and the switch 29c are turned off. The potential VREFH supplied to the one electrode of the capacitor 30c in the period T0 is held in the capacitor 30c in the period T1, and the potential VREFH supplied to the one electrode of the capacitor 31c in the period T0 is held in the capacitor 31c in the period T1.

In the period T1, the potential of the signal SH remains at the high level, so that the switch 33 remains on. The potential VSENCE is supplied to the non-inverting input terminal (+) and the inverting input terminal (−) of the error amplifier EAv as the signal INP and the signal INN, respectively.

In the period T1, the potential of the signal DOCV2 is brought into the high level, so that the switch 28v and the switch 29v are turned on. Accordingly, the potential output from the error amplifier EAv is supplied to a non-inverting input terminal (+) of the Gm amplifier Gmv and one electrode of the capacitor 30v through the switch 28v. The current signal amplified by the error amplifier EAc is supplied to an inverting input terminal (−) of the Gm amplifier Gmv and one electrode of the capacitor 31v through the switch 29v.

The Gm amplifier Gmv generates a correction signal for making the potential output from the error amplifier EAv close to the potential Veac of the current signal amplified by the error amplifier EAc. The generated correction signal is supplied to the power supply terminal of the error amplifier EAv through the switch 34v. Accordingly, the potential output from the error amplifier EAv is corrected so as to gradually come close to the potential Veac with the passage of time from the start of the period T1.

The potential Veac output from the error amplifier EAv is supplied to a non-inverting input terminal (+) of the Gm amplifier Gmv and one electrode of the capacitor 30v through the switch 28v.

In the period T1, the potential of the signal SEL remains at the high level, so that the multiplexer MUX3 selects the potential output from the error amplifier EAc. The selected potential is output from the output terminal OUT. Note that the potential output from the error amplifier EAc is corrected so as to gradually come close to the potential Veac from the potential VREFH with the passage of time from the start of the period T1. Accordingly, the potential output from the output terminal OUT also changes from the potential VREFH toward the potential Veac with the passage of time from the start of the period T1.

In a period T2, the potentials of the signal DOCV1 and the signal DOCC1 remain at the high level, so that the switch 34v and the switch 34c remain on. The potential of the signal DOCC3 remains at the low level, so that the potential ISENCE at the node A is selected in the multiplexer MUX1. Then, the selected potential ISENCE is supplied to the non-inverting input terminal (+) of the error amplifier EAc as the current voltage, so that the current signal is amplified in the error amplifier EAc.

Since the potential of the signal DOCC3 remains at the low level, the potential output from the error amplifier EAv is selected in the multiplexer MUX2.

In the period T2, since the potential of the signal DOCC2 is at the high level, the switch 28c and the switch 29c are on. The potential Veac output from the error amplifier EAc is supplied to the non-inverting input terminal (+) of the Gm amplifier Gmc and the one electrode of the capacitor 30c through the switch 28c. In addition, the potential selected by the multiplexer MUX2, which is the potential output from the error amplifier EAv, is supplied to the inverting input terminal (−) of the Gm amplifier Gmc and the one electrode of the capacitor 31c through the switch 29c.

The Gm amplifier Gmc generates a correction signal for making the potential output from the error amplifier EAc close to the potential output from the error amplifier EAv. The generated correction signal is supplied to the power supply terminal of the error amplifier EAc through the switch 34c.

In the period T2, the potential of the signal DOCV2 is brought into the low level, so that the switch 28v and the switch 29v are turned off. The potential supplied to the one electrode of the capacitor 30v in the period T1 is held in the capacitor 30v in the period T2, and the potential supplied to the one electrode of the capacitor 31v in the period T1 is held in the capacitor 31v in the period T2. The correction signal output from the Gm amplifier Gmv in the period T1 keeps being supplied to the power supply terminal of the error amplifier EAv through the switch 34v in the period T2.

Moreover, in the period T2, the potential of the signal SH is brought into the low level, so that the switch 33 is turned off. As a result, the potential VSENCE is supplied to the non-inverting input terminal (+) of the error amplifier EAv as the signal INP, and the sum of the potential of the node A and the potential difference held in the capacitor 32 is supplied to the inverting input terminal (−) as the signal INN. The difference between the potential of the voltage signal output from the error amplifier EAv and the potential Veac is larger as the potential difference between the signal INP and the signal INN is larger, and is smaller as the potential difference between the signal INP and the signal INN is smaller.

In the period T2, the potential of the signal SEL is brought into the low level, so that the potential output from the error amplifier EAv is selected in the multiplexer MUX3. The selected potential is output from the output terminal OUT.

In a period T3, the same operation as that of the period T1 is performed. In a period T4, the same operation as that of the period T2 is performed.

Configuration Example of Power Conversion Circuit

Next, a configuration example of the power conversion circuit 15, which is different from that illustrated in FIG. 3, will be described.

Figure 10:
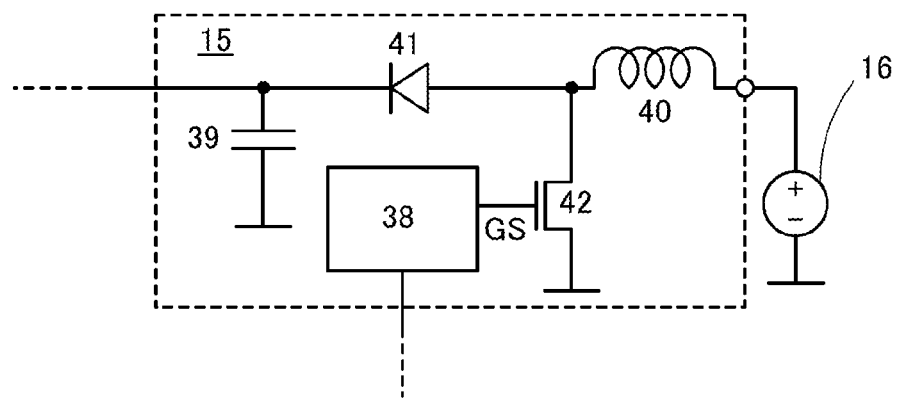
FIG. 10 illustrates a configuration of a power converter circuit.

FIG. 10 illustrates a configuration example of the power conversion circuit 15 having a function of stepping up the input voltage. Specifically, in FIG. 10, the power conversion circuit 15 includes the buffer 38, the capacitor 39, the inductor 40, the diode 41, and the transistor 42. The signal supplied from the output terminal of the driver circuit 20 illustrated in FIG. 3 to the power conversion circuit 15 is supplied to the gate of the transistor 42 through the buffer 38 as the signal GS. The transistor 42 has a function of controlling the conduction between the anode of the diode 41 and a wiring to which a predetermined potential such as a ground potential is supplied and between one terminal of the inductor 40 and the wiring in accordance with the signal GS. The cathode of the diode 41 is electrically connected to one electrode of the capacitor 39. The input voltage from the power source 16 is supplied to the other terminal of the inductor 40. The other electrode of the capacitor 39 is electrically connected to a wiring to which a predetermined potential is supplied.

The one electrode of the capacitor 39 is electrically connected to the other terminal of the resistor 25 included in the voltage detection circuit 13 and the load 11 illustrated in FIG. 3.

In the power conversion circuit 15 illustrated in FIG. 10, electromotive force is generated in the inductor 40 when the transistor 42 is turned on. The voltage applied by the electromotive force and the inductance of the inductor 40 determine the current flowing through the inductor 40. Then, when the transistor 42 is turned off, electromotive force is generated in the inductor 40 in the direction that allows prevention of the change of the above-described current, that is, in the direction opposite to the direction of the electromotive force generated when the transistor 42 is on. Thus, a voltage based on the current flowing through the inductor 40 at the time when the transistor 42 is on is generated between the pair of terminals included in the inductor 40. Then, current flowing through the inductor 40 is held by the voltage generated between the terminals. In other words, when the transistor 42 is off, a path of the current that runs through the inductor 40 and the diode 41 is formed, and the above-described current is maintained in the inductor 40. At this time, the sum of the potential supplied to the other terminal of the inductor 40 and the voltage generated between the terminals of the inductor 40 is supplied to the one electrode of the capacitor 39. The potential supplied to the one electrode of the capacitor 39 is held in the capacitor 39.

As the percentage of the period in which the transistor 42 is on is higher, the potential held in the capacitor 39 is higher. In addition, as the percentage of the period in which the transistor 42 is on is lower, the potential held in the capacitor 39 is lower and closer to the potential of the one terminal of the inductor 40.

Configuration Example of Semiconductor Device

Next, a configuration example of a semiconductor device including a DC-DC converter of one embodiment of the present invention will be described.

Figure 11A:
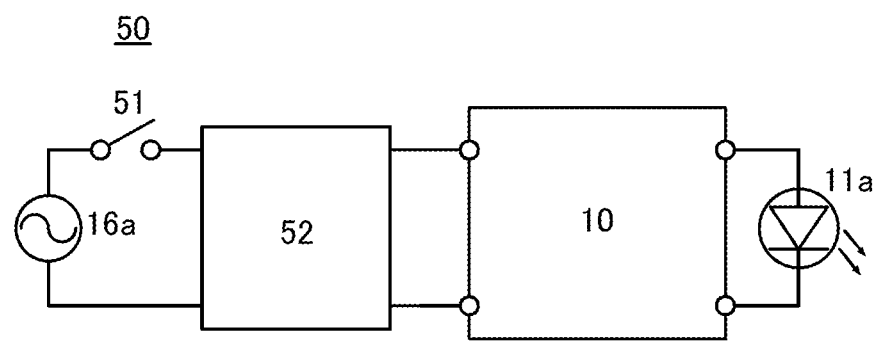
FIGS. 11A and 11B each illustrate a configuration of a semiconductor device including a DC-DC converter.

FIG. 11A illustrates one mode of a light-emitting device 50 which is a semiconductor device. The light-emitting device 50 in FIG. 11A includes an AC power source 16a that is an example of the power source 16, a switch 51, a rectification circuit 52, the DC-DC converter 10, and a light-emitting element 11a that is an example of the load 11. The rectification circuit 52 and the DC-DC converter 10 form a power supply circuit.

Specifically, in the light-emitting device 50 in FIG. 11A, AC voltage from the AC power source 16a is applied to the rectification circuit 52 through the switch 51, and rectified. DC voltage obtained by the rectification is input to the DC-DC converter 10 and output after the level is adjusted. The voltage output from the DC-DC converter 10 is applied to the light-emitting element 11a, so that the light-emitting element 11a emits light. As the light-emitting element 11a, various light sources such as a light-emitting diode (LED) and an organic light-emitting element (OLED) can be used.

Although the light-emitting device 50 in which the AC power source 16a is used as the power source 16 is illustrated in FIG. 11A, one embodiment of the present invention is not limited to this configuration. As the power source, a DC power source may be used instead of the AC power source. Note that in the case of using the DC power source, the rectification circuit 52 is not necessarily provided.

In addition, although the configuration of the light-emitting device 50 in which the AC power source 16a is used as the power source 16 is illustrated in FIG. 11A, the light-emitting device of one embodiment of the present invention does not necessarily include a power source as its component.

Figure 11B:
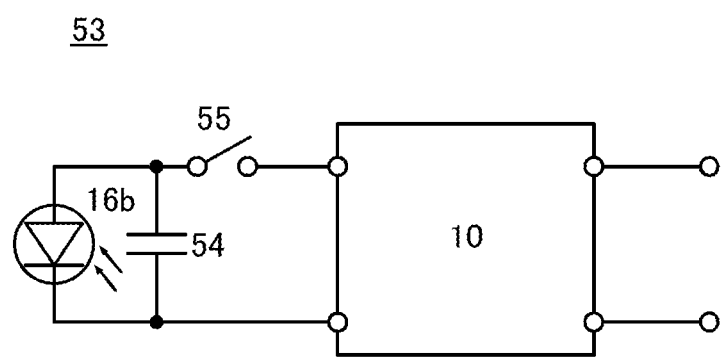

FIG. 11B illustrates one mode of a solar cell 53 which is a semiconductor device.

The solar cell 53 in FIG. 11B includes a photodiode 16b that is an example of the power source 16, a switch 55, a capacitor 54, and the DC-DC converter 10.

Specifically, in the solar cell 53 in FIG. 11B, voltage is generated when the photodiode 16b is irradiated with light. The voltage is smoothed by the capacitor 54 and then input to the DC-DC converter 10 through the switch 55. Then, the voltage input to the DC-DC converter 10 is output after the level of the voltage is adjusted by the DC-DC converter 10.

Example of Cross-Sectional Structure of Semiconductor Device

Figure 12:
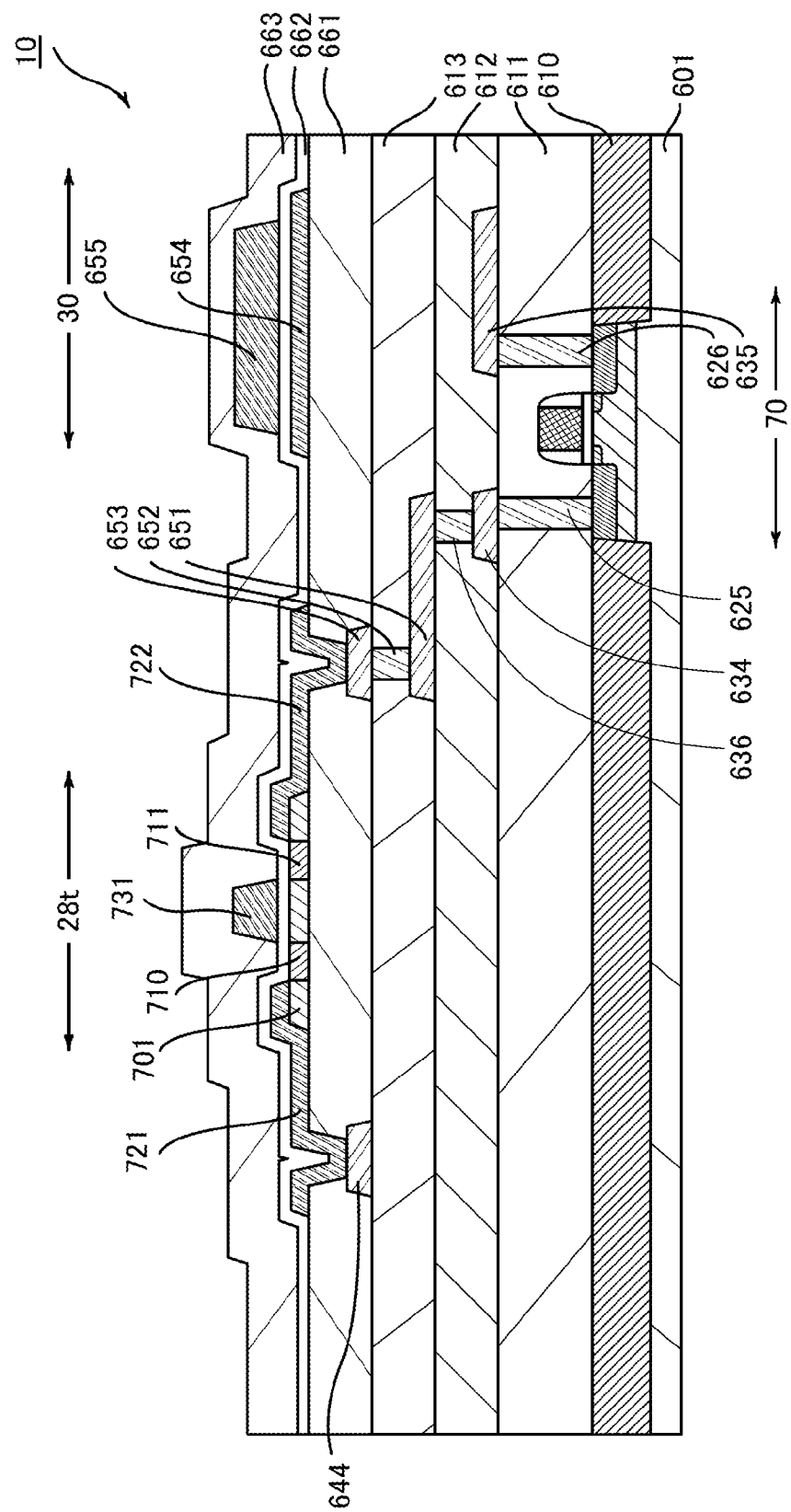
FIG. 12 illustrates a cross-sectional structure of a semiconductor device.

FIG. 12 illustrates an example of a cross-sectional structure of the DC-DC converter 10 illustrated in FIG. 3. Note that FIG. 12 illustrates an example of a cross section of the transistor 28t functioning as the switch 28, the capacitor 30, and a transistor 70 used in the Gm amplifier Gmv, which are included in the correction circuit 19. In the example in FIG. 12, the capacitor 30 and the transistor 28t including a channel formation region in an oxide semiconductor film are formed over the transistor 70 including a channel formation region in a single crystal silicon substrate.

The transistor 70 may include the channel formation region in a semiconductor film or a semiconductor substrate of silicon, germanium, or the like in an amorphous, microcrystalline, polycrystalline, or single crystal state. Alternatively, the transistor 70 may include the channel formation region in an oxide semiconductor film or an oxide semiconductor substrate. In the case where the transistors each include a channel formation region in an oxide semiconductor film or an oxide semiconductor substrate, the transistor 28t is not necessarily stacked over the transistor 70, and the transistors 28t and 70 may be formed in the same layer.

In the case where the transistor 70 is formed using a thin silicon film, any of the following can be used in the thin film: amorphous silicon formed by a sputtering method or a vapor phase growth method such as a plasma-enhanced CVD method; polycrystalline silicon obtained by crystallization of amorphous silicon by treatment such as laser annealing; single crystal silicon obtained by separation of a surface portion of a single crystal silicon wafer by implantation of hydrogen ions or the like into the silicon wafer; and the like.

A semiconductor substrate 601 where the transistor 70 is formed can be, for example, a silicon substrate, a germanium substrate, or a silicon germanium substrate. In FIG. 12, a single crystal silicon substrate is used as the semiconductor substrate 601.

The transistor 70 is electrically isolated by an element isolation method. As the element isolation method, a selective oxidation method (a local oxidation of silicon (LOCOS) method), a trench isolation method (a shallow trench isolation (STI) method), or the like can be used. FIG. 12 illustrates an example where the trench isolation method is used to electrically isolate the transistor 70. Specifically, in FIG. 12, the transistor 70 is electrically isolated by element isolation using an element isolation region 610 formed in such a manner that an insulator including silicon oxide or the like is buried in a trench formed in the semiconductor substrate 601 by etching or the like.

An insulating film 611 is provided over the transistor 70. Openings are formed in the insulating film 611. Conductive films 625 and 626 that are electrically connected to the source and the drain of the transistor 70 are formed in the openings.

The conductive film 625 is electrically connected to a conductive film 634 formed over the insulating film 611. The conductive film 626 is electrically connected to a conductive film 635 formed over the insulating film 611.

An insulating film 612 is formed over the conductive films 634 and 635. An opening is formed in the insulating film 612. A conductive film 636 electrically connected to the conductive film 634 is formed in the opening. The conductive film 636 is electrically connected to a conductive film 651 formed over the insulating film 612.

An insulating film 613 is formed over the conductive film 651. An opening is formed in the insulating film 613. A conductive film 652 electrically connected to the conductive film 651 is formed in the opening. The conductive film 652 is electrically connected to a conductive film 653 formed over the insulating film 613. A conductive film 644 is formed over the insulating film 613.

An insulating film 661 is formed over the conductive film 653 and the conductive film 644. In FIG. 12, the transistor 28t and the capacitor 30 are formed over the insulating film 661.

The transistor 28t includes, over the insulating film 661, a semiconductor film 701 including an oxide semiconductor, conductive films 721 and 722 functioning as source and drain over the semiconductor film 701, a gate insulating film 662 over the semiconductor film 701 and the conductive films 721 and 722, and a gate electrode 731 overlapping with the semiconductor film 701 over the gate insulating film 662 and between the conductive films 721 and 722. Note that the conductive films 721 and 722 are electrically connected to the conductive films 644 and 653, respectively, in the openings formed in the insulating film 661.

In the semiconductor film 701 of the transistor 28t, there is a region 710 between a region overlapping with the conductive film 721 and a region overlapping with the gate electrode 731. In addition, in the semiconductor film 701 of the transistor 28t, there is a region 711 between a region overlapping with the conductive film 722 and the region overlapping with the gate electrode 731. When argon, an impurity which imparts p-type conductivity to the semiconductor film 701, or an impurity which imparts n-type conductivity to the semiconductor film 701 is added to the regions 710 and 711 using the conductive films 721 and 722 and the gate electrode 731 as a mask, the resistivity of the regions 710 and 711 can be made lower than that of the region overlapping with the gate electrode 731 in the semiconductor film 701.

Furthermore, the capacitor 30 includes a conductive film 654 over the insulating film 661, the gate insulating film 662 overlapping with the conductive film 654, and a conductive film 655 overlapping with the conductive film 654 with the gate insulating film 662 interposed therebetween. The conductive film 654 can be formed together with the conductive film 722 by forming a conductive film over the insulating film 661 and processing the conductive film into a desired shape. The conductive film 655 can be formed together with the gate electrode 731 by forming a conductive film over the gate insulating film 662 and processing the conductive film into a desired shape.

An insulating film 663 is provided over the transistor 28t and the capacitor 30.

In FIG. 12, the transistor 28t has the gate electrode 731 on at least one side of the semiconductor film 701; alternatively, the transistor 28t may have a pair of gate electrodes with the semiconductor film 701 positioned therebetween.

In the case where the transistor 28t has a pair of gate electrodes with the semiconductor film 701 positioned therebetween, one of the gate electrodes may be supplied with a signal for controlling the on/off state, and the other of the gate electrodes may be supplied with a potential from another element. In this case, potentials with the same level may be supplied to the pair of gate electrodes, or a fixed potential such as the ground potential may be supplied only to the other of the gate electrodes. By controlling the level of a potential supplied to the other of the gate electrodes, the threshold voltage of the transistor can be controlled.

In FIG. 12, the transistor 28t has a single-gate structure where one channel formation region corresponding to one gate electrode 731 is provided. However, the transistor 28t may have a multi-gate structure where a plurality of electrically connected gate electrodes are provided so that a plurality of channel formation regions are included in one active layer.

<Transistor>

Next, an example of a structure of a transistor 90 that includes a channel formation region in an oxide semiconductor film is described.

Figure 13A:
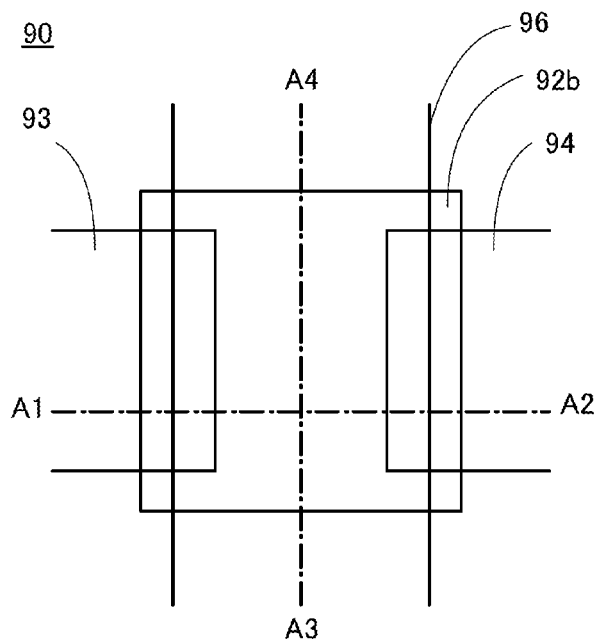
FIGS. 13A to 13C illustrate a structure of a transistor.
Figure 13C:
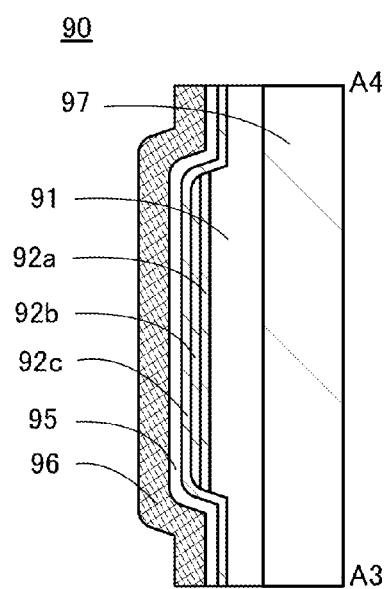
Figure 13B:
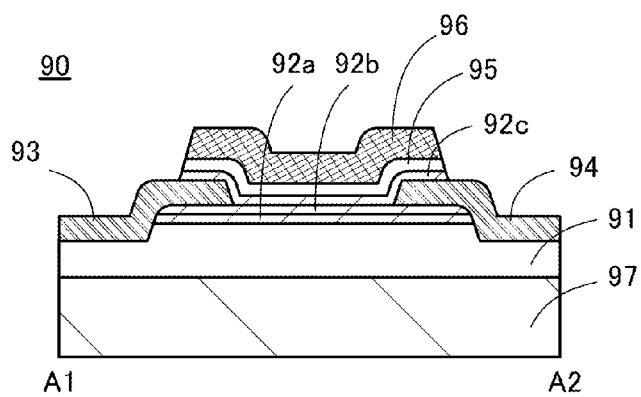

FIGS. 13A to 13C illustrate a structure of the transistor 90 that includes a channel formation region in an oxide semiconductor film as an example. FIG. 13A is a top view of the transistor 90. Note that insulating films are not illustrated in FIG. 13A in order to clarify the layout of the transistor 90. FIG. 13B is a cross-sectional view along the dashed-dotted line A1-A2 in the top view in FIG. 13A. FIG. 13C is a cross-sectional view along the dashed-dotted line A3-A4 in the top view in FIG. 13A.

As illustrated in FIGS. 13A to 13C, the transistor 90 includes an oxide semiconductor film 92a and an oxide semiconductor film 92b that are stacked in this order over an insulating film 91 formed over a substrate 97; a conductive film 93 and a conductive film 94 that are electrically connected to the oxide semiconductor film 92b and function as a source electrode and a drain electrode; an oxide semiconductor film 92c over the oxide semiconductor film 92b, the conductive film 93, and the conductive film 94; an insulating film 95 that functions as a gate insulating film and is located over the oxide semiconductor film 92c; and a conductive film 96 that functions as a gate electrode, lies over the insulating film 95, and overlaps with the oxide semiconductor films 92a to 92c. Note that the substrate 97 may be a glass substrate, a semiconductor substrate, or the like or may be an element substrate where semiconductor elements are formed over a glass substrate or on a semiconductor substrate.

Figure 14A:
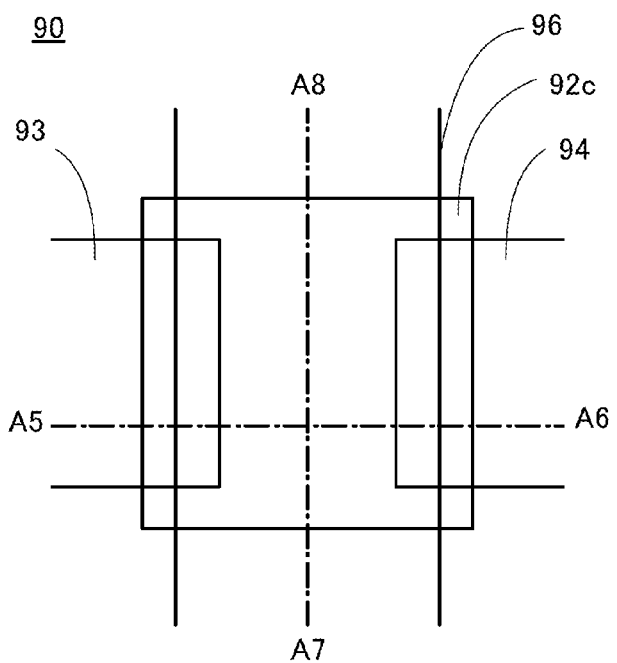
FIGS. 14A to 14C illustrate a structure of a transistor.
Figure 14C:
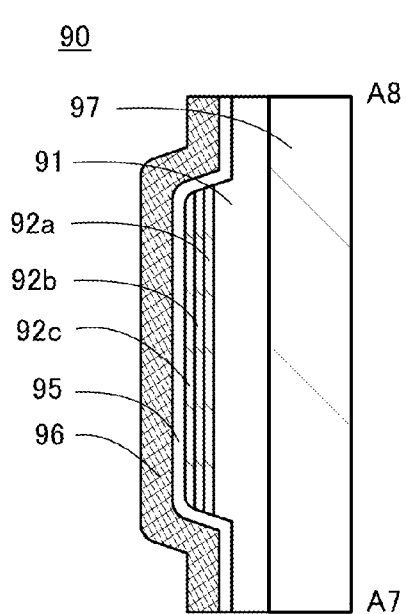
Figure 14B:
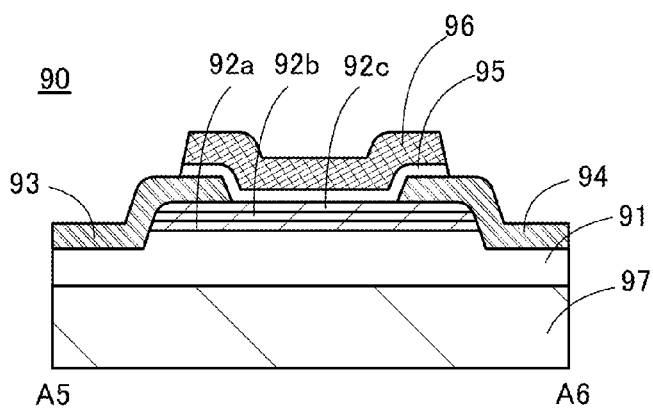

FIGS. 14A to 14C illustrate another specific example of the structure of the transistor 90. FIG. 14A is a top view of the transistor 90. Note that insulating films are not illustrated in FIG. 14A in order to clarify the layout of the transistor 90. FIG. 14B is a cross-sectional view along the dashed-dotted line A1-A2 in the top view in FIG. 14A. FIG. 14C is a cross-sectional view along the dashed-dotted line A3-A4 in the top view in FIG. 14A.

As illustrated in FIGS. 14A to 14C, the transistor 90 includes the oxide semiconductor films 92a to 92c that are stacked in this order over the insulating film 91; the conductive films 93 and 94 that are electrically connected to the oxide semiconductor film 92c and function as a source electrode and a drain electrode; the insulating film 95 that functions as a gate insulating film and is located over the oxide semiconductor film 92c and the conductive films 93 and 94; and the conductive film 96 that functions as a gate electrode, lies over the insulating film 95, and overlaps with the oxide semiconductor films 92a to 92c.

FIGS. 13A to 13C and FIGS. 14A to 14C each illustrate the structure example of the transistor 90 in which the oxide semiconductor films 92a to 92c are stacked. However, the structure of the oxide semiconductor film included in the transistor 90 is not limited to a stacked-layer structure including a plurality of oxide semiconductor films and may be a single-layer structure.

In the case where the transistor 90 includes the semiconductor film in which the semiconductor films 92a to 92c are stacked in this order, each of the oxide semiconductor films 92a and 92c is an oxide film that contains at least one of metal elements contained in the oxide semiconductor film 92b and in which energy at the conduction band minimum is closer to the vacuum level than that in the oxide semiconductor film 92b is by higher than or equal to 0.05 eV, 0.07 eV, 0.1 eV, or 0.15 eV and lower than or equal to 2 eV, 1 eV, 0.5 eV, or 0.4 eV. The oxide semiconductor film 92b preferably contains at least indium because carrier mobility is increased.

In the case where the transistor 90 includes the semiconductor films with the above structure, when an electric field is applied to the semiconductor films by applying voltage to the gate electrode, a channel region is formed in the oxide semiconductor film 92*b*, which has the lowest conduction band minimum among the semiconductor films. That is, since the oxide semiconductor film 92*c* is provided between the oxide semiconductor film 92*b* and the insulating film 95, a channel region can be formed in the oxide semiconductor film 92*b*, which is separated from the insulating film 95.

Since the oxide semiconductor film 92*c* contains at least one of metal elements contained in the oxide semiconductor film 92*b*, interface scattering is unlikely to occur at the interface between the oxide semiconductor film 92*b* and the oxide semiconductor film 92*c*. Thus, the movement of carriers is unlikely to be inhibited at the interface, which results in an increase in the field-effect mobility of the transistor 90.

When an interface state is formed at an interface between the oxide semiconductor films 92*b* and 92*a*, a channel region is also formed in a region close to the interface; thus, the threshold voltage of the transistor 90 varies. However, since the oxide semiconductor film 92*a* contains at least one of metal elements contained in the oxide semiconductor film 92*b*, an interface state is unlikely to be formed at the interface between the oxide semiconductor film 92*b* and the oxide semiconductor film 92*a*. Accordingly, the above structure can reduce variations in electrical characteristics of the transistor 90, such as the threshold voltage.

Further, it is preferable that a plurality of oxide semiconductor films be stacked so that an interface state due to an impurity existing between the oxide semiconductor films, which inhibits carrier flow, is not formed at an interface between the oxide semiconductor films. This is because when an impurity exists between the stacked oxide semiconductor films, the energy continuity of the conduction band minimum between the oxide semiconductor films is lost, and carriers are trapped or disappear by recombination in the vicinity of the interface. By reducing an impurity existing between the films, a continuous junction (here, in particular, a well structure having a U shape in which the conduction band minimum is changed continuously between the films) is formed easily as compared with the case of merely stacking the plurality of oxide semiconductor films which contain at least one common metal as a main component.

In order to form such a continuous junction, it is necessary to form films continuously without being exposed to air, with use of a multi-chamber deposition apparatus (sputtering apparatus) including a load lock chamber. Each chamber in the sputtering apparatus is preferably subjected to high vacuum evacuation (to a vacuum of about $5\times10^{-7}$ Pa to $1\times10^{-4}$ Pa) with use of a suction vacuum evacuation pump such as a cryopump so that water or the like, which is an impurity for an oxide semiconductor, is removed as much as possible. Alternatively, a turbo molecular pump and a cold trap are preferably used in combination to prevent backflow of gas into the chamber through an evacuation system.

To obtain a highly purified intrinsic oxide semiconductor, not only high vacuum evacuation of the chambers but also high purification of a gas used in the sputtering is important. When an oxygen gas or an argon gas used as the above gas has a dew point of −40° C. or lower, preferably −80° C. or lower, further preferably −100° C. or lower and is highly purified, moisture and the like can be prevented from entering the oxide semiconductor film as much as possible. Specifically, in the case where the oxide semiconductor film 92*b* is an In-M-Zn oxide film (M represents Ga, Y, Zr, La, Ce, or Nd) and a target having the atomic ratio of metal elements of In:M:Zn=$x_1$:$y_1$:$z_1$ is used for forming the oxide semiconductor film 92*b*, $x_1/y_1$ is preferably greater than or equal to ⅓ and less than or equal to 6, further preferably greater than or equal to 1 and less than or equal to 6, and $z_1/y_1$ is preferably greater than or equal to ⅓ and less than or equal to 6, further preferably greater than or equal to 1 and less than or equal to 6. Note that when $z_1/y_1$ is greater than or equal to 1 and less than or equal to 6, a c-axis aligned crystalline oxide semiconductor (CAAC-OS) film as the oxide semiconductor film 92*b* is easily formed. Typical examples of the atomic ratio of the metal elements of the target are In:M:Zn=1:1:1 and In:M:Zn=3:1:2.

Specifically, in the case where the oxide semiconductor film 92*a* and the oxide semiconductor film 92*c* are an In-M-Zn oxide film (M represents Ga, Y, Zr, La, Ce, or Nd) and a target having the atomic ratio of metal elements of In:M:Zn=$x_2$:$y_2$:$z_2$ is used for forming the oxide semiconductor films 92*a* and 92*c*, $x_2/y_2$ is preferably less than $x_1/y_1$, and $z_2/y_2$ is preferably greater than or equal to ⅓ and less than or equal to 6, further preferably greater than or equal to 1 and less than or equal to 6. Note that when $z_2/y_2$ is greater than or equal to 1 and less than or equal to 6, CAAC-OS films are easily formed as the oxide semiconductor films 92*a* and 92*c*. Typical examples of the atomic ratio of the metal elements of the target are In:M:Zn=1:3:2, In:M:Zn=1:3:4, In:M:Zn=1:3:6, In:M:Zn=1:3:8, and the like.

The oxide semiconductor film 92*a* and the oxide semiconductor film 92*c* each have a thickness of more than or equal to 3 nm and less than or equal to 100 nm, preferably more than or equal to 3 nm and less than or equal to 50 nm. The thickness of the oxide semiconductor film 92*b* is more than or equal to 3 nm and less than or equal to 200 nm, preferably more than or equal to 3 nm and less than or equal to 100 nm, further preferably more than or equal to 3 nm and less than or equal to 50 nm.

In the three-layer semiconductor film, the three oxide semiconductor films 92*a* to 92*c* can be either amorphous or crystalline. Note that the oxide semiconductor film 92*b* in which a channel region is formed preferably has a crystalline structure, in which case the transistor 90 can have stable electrical characteristics.

Note that a channel formation region refers to a region of a semiconductor film of the transistor 90 that overlaps with a gate electrode and is between a source electrode and a drain electrode. A channel region refers to a region through which current mainly flows in the channel formation region.

For example, when an In—Ga—Zn oxide film formed by a sputtering method is used as each of the oxide semiconductor films 92*a* and 92*c*, the oxide semiconductor films 92*a* and 92*c* can be deposited with the use of an In—Ga—Zn oxide target containing In, Ga, and Zn in an atomic ratio of 1:3:2. The deposition conditions can be as follows: an argon gas (flow rate: 30 sccm) and an oxygen gas (flow rate: 15 sccm) are used as the deposition gas; the pressure is 0.4 Pa; the substrate temperature is 200° C.; and the DC power is 0.5 kW.

Further, when the oxide semiconductor film 92*b* is a CAAC-OS film, the oxide semiconductor film 92*b* is preferably deposited with the use of a polycrystalline target containing In—Ga—Zn oxide (In:Ga:Zn=1:1:1 in an atomic ratio). The deposition conditions can be as follows: an argon gas (flow rate: 30 sccm) and an oxygen gas (flow rate: 15 sccm) are used as the deposition gas; the pressure is 0.4 Pa; the substrate temperature is 300° C.; and the DC power is 0.5 kW.

Although the oxide semiconductor films 92*a* to 92*c* can be formed by a sputtering method, they may be formed by another method, e.g., a thermal CVD method. A metal organic chemical vapor deposition (MOCVD) method or an atomic layer deposition (ALD) method may be employed as an example of a thermal CVD method.

There are few carrier generation sources in a highly purified oxide semiconductor (purified oxide semiconductor) obtained by reduction of impurities such as moisture and hydrogen serving as electron donors (donors) and reduction of oxygen vacancies; therefore, the highly purified oxide semiconductor can be an intrinsic (i-type) semiconductor or a substantially i-type semiconductor. For this reason, a transistor having a channel formation region in a highly purified oxide semiconductor film has extremely small off-state current and high reliability. Thus, a transistor in which a channel formation region is formed in the oxide semiconductor film easily has an electrical characteristic of a positive threshold voltage (also referred to as a normally-off characteristic).

Specifically, various experiments can prove a small off-state current of a transistor having a channel formation region in a highly purified oxide semiconductor film. For example, even when an element has a channel width of $1\times10^6$ μm and a channel length of 10 μm, off-state current can be less than or equal to the measurement limit of a semiconductor parameter analyzer, i.e., less than or equal to $1\times10^{-13}$ A, at voltage (drain voltage) between the source electrode and the drain electrode of from 1 V to 10 V. In that case, it can be seen that off-state current of the transistor normalized on the channel width is lower than or equal to 100 zA/μm. In addition, a capacitor and a transistor were connected to each other and off-state current was measured using a circuit in which charges flowing to or from the capacitor are controlled by the transistor. In the measurement, a highly purified oxide semiconductor film was used for a channel formation region of the transistor, and the off-state current of the transistor was measured from a change in the amount of charges of the capacitor per unit time. As a result, it can be seen that, in the case where the voltage between the source electrode and the drain electrode of the transistor is 3 V, a lower off-state current of several tens of yoctoamperes per micrometer (yA/μm) is obtained. Accordingly, the transistor including a channel formation region in the highly purified oxide semiconductor film has much lower off-state current than a crystalline silicon transistor.

In the case where an oxide semiconductor film is used as the semiconductor film, at least indium (In) or zinc (Zn) is preferably included as an oxide semiconductor. In addition, as a stabilizer for reducing variations in electrical characteristics among transistors formed using such an oxide semiconductor, gallium (Ga) is preferably contained in addition to In and Zn. Tin (Sn) is preferably contained as a stabilizer. Hafnium (Hf) is preferably contained as a stabilizer. Aluminum (Al) is preferably contained as a stabilizer. Zirconium (Zr) is preferably contained as a stabilizer.

Among oxide semiconductors, unlike silicon carbide, gallium nitride, or gallium oxide, an In—Ga—Zn oxide, an In—Sn—Zn oxide, or the like has an advantage of high mass productivity because a transistor with favorable electrical characteristics can be formed by a sputtering method or a wet process. Further, unlike silicon carbide, gallium nitride, or gallium oxide, with the use of the In—Ga—Zn oxide, a transistor with favorable electrical characteristics can be formed over a glass substrate. Further, a larger substrate can be used.

As another stabilizer, one or more lanthanoids selected from lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) may be contained.

As the oxide semiconductor, any of the following oxides can be used, for example: indium oxide, gallium oxide, tin oxide, zinc oxide, an In—Zn oxide, an Sn—Zn oxide, an Al—Zn oxide, a Zn—Mg oxide, an Sn—Mg oxide, an In—Mg oxide, an In—Ga oxide, an In—Ga—Zn oxide (also referred to as IGZO), an In—Al—Zn oxide, an In—Sn—Zn oxide, an Sn—Ga—Zn oxide, an Al—Ga—Zn oxide, an Sn—Al—Zn oxide, an In—Hf—Zn oxide, an In—La—Zn oxide, an In—Pr—Zn oxide, an In—Nd—Zn oxide, an In—Ce—Zn oxide, an In—Sm—Zn oxide, an In—Eu—Zn oxide, an In—Gd—Zn oxide, an In—Tb—Zn oxide, an In—Dy—Zn oxide, an In—Ho—Zn oxide, an In—Er—Zn oxide, an In—Tm—Zn oxide, an In—Yb—Zn oxide, an In—Lu—Zn oxide, an In—Sn—Ga—Zn oxide, an In—Hf—Ga—Zn oxide, an In—Al—Ga—Zn oxide, an In—Sn—Al—Zn oxide, an In—Sn—Hf—Zn oxide, and an In—Hf—Al—Zn oxide.

For example, an In—Ga—Zn oxide refers to an oxide containing In, Ga, and Zn, and there is no limitation on the ratio of In to Ga and Zn. Further, the In—Ga—Zn oxide may contain a metal element other than In, Ga, and Zn. The In—Ga—Zn oxide has sufficiently high resistance when no electric field is applied thereto, so that off-state current can be sufficiently reduced. Moreover, the In—Ga—Zn oxide has high mobility.

For example, high mobility can be obtained relatively easily in the case of using an In—Sn—Zn oxide. Meanwhile, when an In—Ga—Zn oxide is used, the mobility can be increased by reducing the defect density in a bulk.

In the transistor 90, a metal in the source and drain electrodes might extract oxygen from the oxide semiconductor film depending on a conductive material used for the source and drain electrodes. In such a case, a region of the oxide semiconductor film in contact with the source electrode or the drain electrode becomes an n-type region due to the formation of an oxygen vacancy. The n-type region serves as a source region or a drain region, resulting in a decrease in the contact resistance between the oxide semiconductor film and the source electrode or the drain electrode. Accordingly, the formation of the n-type region increases the mobility and on-state current of the transistor 90, achieving the high-speed operation of a semiconductor device using the transistor 90.

Note that the extraction of oxygen by a metal in the source electrode and the drain electrode is probably caused when the source electrode and the drain electrode are formed by a sputtering method or when heat treatment is performed after the formation of the source electrode and the drain electrode. The n-type region is more likely to be formed by forming the source electrode and the drain electrode with use of a conductive material which is easily bonded to oxygen. Examples of such a conductive material include Al, Cr, Cu, Ta, Ti, Mo, and W.

Furthermore, in the case where the semiconductor film including the stacked oxide semiconductor films is used in the transistor 90, the n-type region preferably extends to the oxide semiconductor film 92b serving as a channel region in order that the mobility and on-state current of the transistor 90 can be further increased and the semiconductor device can operate at higher speed.

The insulating film 91 preferably has a function of supplying part of oxygen to the oxide semiconductor films 92a to 92c by heating. It is preferable that the number of defects in the insulating film 91 be small, and typically the spin density of g=2.001 due to a dangling bond of silicon be lower than or equal to $1\times10^{18}$ spins/cm$^3$. The spin density is measured by electron spin resonance (ESR) spectroscopy.

The insulating film 91, which has a function of supplying part of oxygen to the oxide semiconductor films 92a to 92c by heating, is preferably an oxide. Examples of the oxide include aluminum oxide, magnesium oxide, silicon oxide, silicon oxynitride, silicon nitride oxide, gallium oxide, germanium oxide, yttrium oxide, zirconium oxide, lanthanum oxide, neodymium oxide, hafnium oxide, and tantalum oxide. The insulating film 91 can be formed by a plasma CVD (chemical vapor deposition) method, a sputtering method, or the like.

Note that in this specification, oxynitride contains more oxygen than nitrogen, and nitride oxide contains more nitrogen than oxygen.

Note that in the transistor 90 illustrated in FIGS. 13A to 13C or FIGS. 14A to 14C, the conductive film 96 overlaps with end portions of the oxide semiconductor film 92b including a channel region that do not overlap with the conductive films 93 and 94, i.e., end portions of the oxide semiconductor film 92b that are in a region different from a region where the conductive films 93 and 94 are located. When the end portions of the oxide semiconductor film 92b are exposed to plasma by etching for forming the end portions, a chlorine radical, a fluorine radical, or other radicals generated from an etching gas are easily bonded to a metal element contained in an oxide semiconductor. For this reason, it can be considered that, in the end portions of the oxide semiconductor film, oxygen bonded to the metal element is easily released, so that an oxygen vacancy is easily formed; thus, the end portions of the oxide semiconductor film easily have n-type conductivity. However, an electric field applied to the end portions can be controlled by controlling the potential of the conductive film 96 because the end portions of the oxide semiconductor film 92b that do not overlap with the conductive films 93 and 94 overlap with the conductive film 96 in the transistor 90 illustrated in FIGS. 13A to 13C or FIGS. 14A to 14C. Consequently, current that flows between the conductive films 93 and 94 through the end portions of the oxide semiconductor film 92b can be controlled by the potential applied to the conductive film 96. Such a structure of the transistor 90 is referred to as a surrounded channel (s-channel) structure.

With the s-channel structure, specifically, when a potential at which the transistor 90 is turned off is supplied to the conductive film 96, the amount of off-state current that flows between the conductive films 93 and 94 through the end portions can be reduced. For this reason, in the transistor 90, even when the distance between the conductive films 93 and 94 at the end portions of the oxide semiconductor film 92b is reduced as a result of reducing the channel length to obtain high on-state current, the transistor 90 can have low off-state current. Consequently, with the short channel length, the transistor 90 can have high on-state current when in an on state and low off-state current when in an off state.

With the s-channel structure, specifically, when a potential at which the transistor 90 is turned on is supplied to the conductive film 96, the amount of current that flows between the conductive films 93 and 94 through the end portions of the oxide semiconductor film 92b can be increased. The current contributes to an increase in the field-effect mobility and an increase in the on-state current of the transistor 90. When the end portions of the oxide semiconductor film 92b overlap with the conductive film 96, carriers flow in a wide region of the oxide semiconductor film 92b without being limited to a region in the vicinity of the interface between the oxide semiconductor film 92b and the insulating film 95, which results in an increase in the amount of carrier movement in the transistor 90. As a result, the on-state current of the transistor 90 is increased, and the field-effect mobility is increased to greater than or equal to 10 $cm^2V \cdot s$ or to greater than or equal to 20 $cm^2/V \cdot s$, for example. Note that here, the field-effect mobility is not an approximate value of the mobility as the physical property of the oxide semiconductor film but is the apparent field-effect mobility in a saturation region of the transistor, which is an index of current drive capability.

A structure of the oxide semiconductor film is described below.

In this specification, a term "parallel" indicates that the angle formed between two straight lines is greater than or equal to $-10°$ and less than or equal to $10°$, and accordingly also includes the case where the angle is greater than or equal to $-5°$ and less than or equal to $5°$. In addition, the term "substantially parallel" indicates that the angle formed between two straight lines is greater than or equal to $-30°$ and less than or equal to $30°$. In addition, the term "substantially perpendicular" indicates that the angle formed between two straight lines is greater than or equal to $80°$ and less than or equal to $100°$, and accordingly includes the case where the angle is greater than or equal to $85°$ and less than or equal to $95°$. In addition, the term "substantially perpendicular" indicates that the angle formed between two straight lines is greater than or equal to $60°$ and less than or equal to $120°$.

In this specification, trigonal and rhombohedral crystal systems are included in a hexagonal crystal system.

An oxide semiconductor is classified into a non-single-crystal oxide semiconductor and a single crystal oxide semiconductor. Furthermore, an oxide semiconductor is classified into, for example, a crystalline oxide semiconductor and an amorphous oxide semiconductor.

Examples of a non-single-crystal oxide semiconductor include a c-axis aligned crystalline oxide semiconductor (CAAC-OS), a polycrystalline oxide semiconductor, a microcrystalline oxide semiconductor, and an amorphous oxide semiconductor. In addition, examples of a crystalline oxide semiconductor include a single crystal oxide semiconductor, a CAAC-OS, a polycrystalline oxide semiconductor, and a microcrystalline oxide semiconductor.

First, a CAAC-OS film is described.

The CAAC-OS film is one of oxide semiconductor films having a plurality of c-axis aligned crystal parts.

When observing the CAAC-OS film in a combined analysis image of a bright-field image and a diffraction pattern with the use of a transmission electron microscope (TEM) (the combined analysis image is also referred to as a high-resolution TEM image), a plurality of crystal parts can be found. However, in the high-resolution TEM image, a boundary between crystal parts, that is, a grain boundary is not clearly found. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting a surface over which the CAAC-OS film is formed (hereinafter, a surface over which the CAAC-OS film is formed is referred to as a formation surface) or a top surface of the CAAC-OS film, and is arranged parallel to the formation surface or the top surface of the CAAC-OS film.

In a high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an InGaZnO$_4$ crystal is analyzed by an out-of-plane method, a peak appears frequently when the diffraction angle (2θ) is around 31°. This peak is derived from the (009) plane of the InGaZnO$_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film including an InGaZnO$_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has a higher strength of bonding to oxygen than that of a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor using the oxide semiconductor film rarely has negative threshold voltage (is rarely normally on). The highly purified intrinsic or substantially highly purified intrinsic oxide semiconductor film has few carrier traps. Accordingly, the transistor using the oxide semiconductor film has little change in electrical characteristics and high reliability. Electrical charges trapped by the carrier traps in the oxide semiconductor film take a long time to be released, and might behave like fixed electrical charges. Thus, the transistor that uses the oxide semiconductor film having high impurity concentration and a high density of defect states has unstable electrical characteristics in some cases.

With the use of the CAAC-OS film in a transistor, a change in the electrical characteristics of the transistor due to irradiation with visible light or ultraviolet light is small.

Next, a microcrystalline oxide semiconductor film is described.

A microcrystalline oxide semiconductor film has a region where a crystal part can be found in the high-resolution TEM image and a region where a crystal part cannot be found clearly in the high-resolution TEM image. In most cases, a crystal part in the microcrystalline oxide semiconductor film is greater than or equal to 1 nm and less than or equal to 100 nm, or greater than or equal to 1 nm and less than or equal to 10 nm. A microcrystal with a size greater than or equal to 1 nm and less than or equal to 10 nm, or a size greater than or equal to 1 nm and less than or equal to 3 nm is specifically referred to as nanocrystal (nc). An oxide semiconductor film including nanocrystal is referred to as a nanocrystalline oxide semiconductor (nc-OS) film. In a high-resolution TEM image of the nc-OS film, a crystal grain boundary cannot be found clearly in the nc-OS film in some cases.

In the nc-OS film, a microscopic region (for example, a region with a size greater than or equal to 1 nm and less than or equal to 10 nm, in particular, a region with a size greater than or equal to 1 nm and less than or equal to 3 nm) has a periodic atomic arrangement. There is no regularity of crystal orientation between different crystal parts in the nc-OS film. Thus, the orientation of the whole film is not observed. Accordingly, in some cases, the nc-OS film cannot be distinguished from an amorphous oxide semiconductor film depending on an analysis method. For example, when the nc-OS film is subjected to structural analysis by an out-of-plane method with an XRD apparatus using an X-ray having a diameter larger than that of a crystal part, a peak which shows a crystal plane does not appear. Further, a diffraction pattern like a halo pattern appears in a selected-area electron diffraction pattern of the nc-OS film that is obtained by using an electron beam having a probe diameter (e.g., larger than or equal to 50 nm) larger than the diameter of a crystal part. Meanwhile, spots are observed in a nanobeam electron diffraction pattern of the nc-OS film that is obtained by using an electron beam having a probe diameter close to, or smaller than the diameter of a crystal part. Further, in a nanobeam electron diffraction pattern of the nc-OS film, regions with high luminance in a circular (ring) pattern are observed in some cases. Also in a nanobeam electron diffraction pattern of the nc-OS film, a plurality of spots are observed in a ring-like region in some cases.

The nc-OS film is an oxide semiconductor film having more regularity than an amorphous oxide semiconductor film; thus, the nc-OS film has a lower density of defect states than the amorphous oxide semiconductor film. However, there is no regularity of crystal orientation between different crystal parts in the nc-OS film; hence, the nc-OS film has a higher density of defect states than the CAAC-OS film.

Next, an amorphous oxide semiconductor film is described.

The amorphous oxide semiconductor film has disordered atomic arrangement and no crystal part. For example, the amorphous oxide semiconductor film does not have a specific state like quartz.

In a high-resolution TEM image of the amorphous oxide semiconductor film, crystal parts cannot be found.

When the amorphous oxide semiconductor film is subjected to structural analysis by an out-of-plane method with an XRD apparatus, a peak which shows a crystal plane does not appear. A halo pattern is shown in an electron diffraction pattern of the amorphous oxide semiconductor film. Furthermore, a halo pattern is shown but a spot is not shown in a nanobeam electron diffraction pattern of the amorphous oxide semiconductor film.

Note that an oxide semiconductor film may have a structure having physical properties between the nc-OS film and the amorphous oxide semiconductor film. The oxide semiconductor film having such a structure is specifically referred to as an amorphous-like oxide semiconductor (a-like OS) film.

In a high-resolution TEM image of the a-like OS film, a void may be seen. Furthermore, in the high-resolution TEM image, there are a region where a crystal part is clearly observed and a region where a crystal part is not observed. In the a-like OS film, crystallization by a slight amount of electron beam used for TEM observation occurs and growth of the crystal part is found sometimes. In contrast, crystallization by a slight amount of electron beam used for TEM observation is less observed in the nc-OS film having good quality.

Note that the crystal part size in the a-like OS film and the nc-OS film can be measured using high-resolution TEM images. For example, an InGaZnO$_4$ crystal has a layered structure in which two Ga—Zn—O layers are included between In—O layers. A unit cell of the InGaZnO$_4$ crystal has a structure in which nine layers of three In—O layers and six Ga—Zn—O layers are layered in the c-axis direction. Accordingly, the spacing between these adjacent layers is equivalent to the lattice spacing on the (009) plane (also referred to as d value). The value is calculated to 0.29 nm from crystal structure analysis. Thus, each of the lattice fringes in which the spacing therebetween is from 0.28 nm to 0.30 nm corresponds to the a-b plane of the InGaZnO$_4$ crystal, focusing on the lattice fringes in the high-resolution TEM image.

Furthermore, the density of an oxide semiconductor varies depending on the structure in some cases. For example, when the composition of an oxide semiconductor film is determined, the structure of the oxide semiconductor can be expected by comparing the density of the oxide semiconductor film with the density of a single crystal oxide semiconductor film having the same composition as the oxide semiconductor film. For example, the density of the a-like OS film is higher than or equal to 78.6% and lower than 92.3% of the density of the single crystal oxide semiconductor film having the same composition. For example, the density of each of the nc-OS film and the CAAC-OS film is higher than or equal to 92.3% and lower than 100% of the density of the single crystal oxide semiconductor film having the same composition. Note that it is difficult to deposit an oxide semiconductor having a density of lower than 78% of the density of the single crystal oxide semiconductor film.

Specific examples of the above description are given. For example, in an oxide semiconductor film in which the atomic ratio of In to Ga and Zn is 1:1:1, the density of a single crystal of InGaZnO$_4$ with a rhombohedral crystal structure is 6.357 g/cm$^3$. Accordingly, in the oxide semiconductor film in which the atomic ratio of In to Ga and Zn is 1:1:1, the density of the a-like OS film is higher than or equal to 5.0 g/cm$^3$ and lower than 5.9 g/cm$^3$, and the density of the nc-OS film and the CAAC-OS film is higher than or equal to 5.9 g/cm$^3$ and lower than 6.3 g/cm$^3$.

However, there might be no single crystal oxide semiconductor film having the same composition as the oxide semiconductor film. In that case, single crystal oxide semiconductor films with different compositions are combined in an adequate ratio to calculate the density equivalent to that of a single crystal oxide semiconductor film with the desired composition. The density of the single crystal oxide semiconductor film with the desired composition may be obtained by calculating the weighted average of the film densities of the single crystal oxide semiconductor films with the different compositions in consideration of the combination ratio therebetween. Note that it is preferable to use as few kinds of single crystal oxide semiconductor film as possible to calculate the density.

Note that an oxide semiconductor film may be a stacked film including two or more films of an amorphous oxide semiconductor film, an a-like OS film, a microcrystalline oxide semiconductor film, and a CAAC-OS film, for example.

For the deposition of the CAAC-OS film, the following conditions are preferably employed.

By reducing the amount of impurities entering the CAAC-OS film during the deposition, the crystal state can be prevented from being broken by the impurities. For example, the concentration of impurities (e.g., hydrogen, water, carbon dioxide, and nitrogen) which exist in the treatment chamber may be reduced. The concentration of impurities in a deposition gas may also be reduced. Specifically, a deposition gas whose dew point is −80° C. or lower, preferably −100° C. or lower is used.

By increasing the substrate heating temperature during the deposition, migration of a sputtered particle is likely to occur after the sputtered particle reaches the substrate. Specifically, the substrate heating temperature during the deposition is higher than or equal to 100° C. and lower than or equal to 740° C., preferably higher than or equal to 200° C. and lower than or equal to 500° C. By increasing the substrate heating temperature during the deposition, when the flat-plate-like or pellet-like sputtered particle reaches the substrate, migration occurs on the substrate, so that a flat plane of the sputtered particle is attached to the substrate.

Furthermore, it is preferable to reduce plasma damage during the deposition by increasing the proportion of oxygen in the deposition gas and optimizing power. The proportion of oxygen in the deposition gas is 30 vol % or higher, preferably 100 vol %.

As an example of the target, an In—Ga—Zn oxide target is described below.

The In—Ga—Zn oxide target, which is polycrystalline, is made by mixing InO$_X$ powder, GaO$_Y$ powder, and ZnO$_Z$ powder in a predetermined molar ratio, applying pressure, and performing heat treatment at a temperature higher than or equal to 1000° C. and lower than or equal to 1500° C. Note that X, Y, and Z are each a given positive number. Here, the predetermined molar ratio of InO$_X$ powder to GaO$_Y$ powder and ZnO$_Z$ powder is, for example, 2:2:1, 8:4:3, 3:1:1, 1:1:1, 4:2:3, 2:1:3, or 3:1:2. The kinds of powder and the molar ratio for mixing powder may be determined as appropriate depending on a target to be formed. A CAAC-OS film formed using a target with a molar ratio of In:Ga:Zn=2:1:3 can have a particularly high proportion of regions where a diffraction pattern of CAAC-OS is observed in a predetermined area (also referred to as proportion of CAAC); thus, a transistor having a channel formation region in this CAAC-OS film can have excellent frequency characteristics.

An alkali metal is not a constituent element of an oxide semiconductor and thus is an impurity. Also, alkaline earth metal is an impurity in the case where the alkaline earth metal is not a constituent element of the oxide semiconductor. Alkali metal, in particular, Na becomes Na$^+$ when an insulating film in contact with the oxide semiconductor film is an oxide and Na diffuses into the insulating film. In addition, in the oxide semiconductor film, Na cuts or enters a bond between metal and oxygen which are included in the oxide semiconductor. As a result, the electrical characteristics of the transistor deteriorate, for example, the transistor is placed in a normally-on state because of a negative shift of the threshold voltage or the mobility is decreased. In addition, the characteristics of transistors vary. Specifically, the Na concentration measured by secondary ion mass spectrometry is preferably 5×10$^{16}$ /cm$^3$ or lower, further preferably 1×10$^{16}$ /cm$^3$ or lower, still further preferably 1×10$^{15}$ /cm$^3$ or lower. Similarly, the measured Li concentration is preferably 5×10$^{15}$ /cm$^3$ or lower, further preferably 1×10$^{15}$ /cm$^3$ or lower. Similarly, the measured K concentration is preferably 5×10$^{15}$ /cm$^3$ or lower, further preferably 1×10$^{15}$ /cm$^3$ or lower.

In the case where a metal oxide containing indium is used, silicon or carbon having higher bond energy with oxygen than that of indium might cut the bond between indium and oxygen, so that an oxygen vacancy is formed. Accordingly, when silicon or carbon is contained in the oxide semiconductor film, the electrical characteristics of the transistor are likely to deteriorate as in the case of using an alkali metal or an alkaline earth metal. Thus, the concentration of silicon and the concentration of carbon in the oxide semiconductor film are preferably low. Specifically, the C concentration or the Si concentration measured by secondary ion mass spectrometry is preferably less than or equal to $1\times10^{18}/cm^3$. In this case, the deterioration of the electrical characteristics of the transistor can be prevented, so that the reliability of a semiconductor device can be improved.

Example of Cross-Sectional Structure of Semiconductor Device

Figure 15:
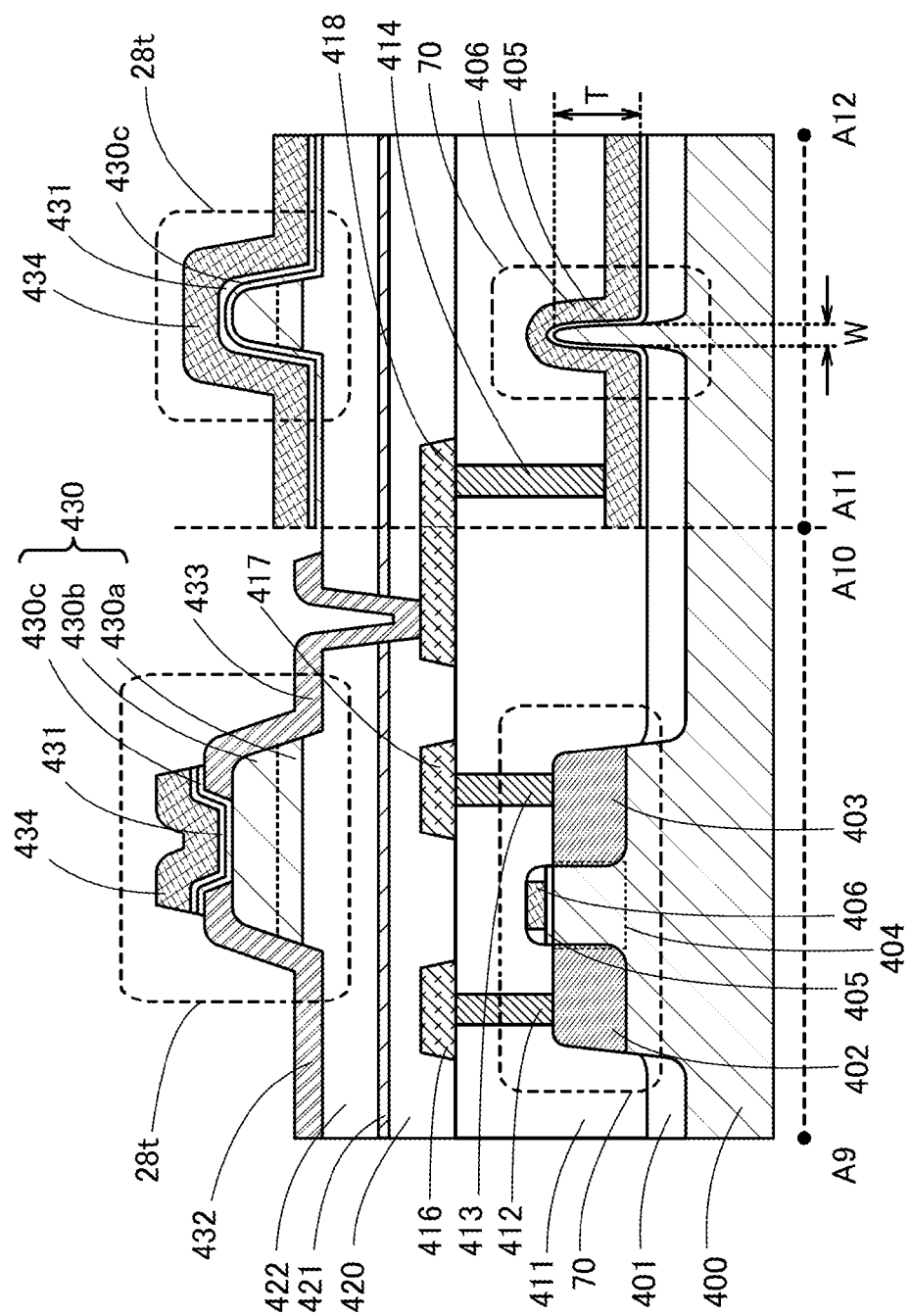
FIG. 15 illustrates a cross-sectional structure of a semiconductor device.

FIG. 15 illustrates an example of a cross-sectional structure of the DC-DC converter 10 illustrated in FIG. 3. Note that FIG. 15 illustrates an example of a cross section of the transistor 28t functioning as the switch 28 and the transistor 70 used in the Gm amplifier Gmv, which are included in the correction circuit 19. Specifically, the structure of the transistor 28t and the transistor 70 in the channel length direction is illustrated in the cross section along the broken line A9-A10, and the structure of the transistor 28t and the transistor 70 in the channel width direction is illustrated in the cross section along the broken line A11-A12. In one embodiment of the present invention, the channel length direction of one transistor is not necessarily the same as the channel length direction of another transistor.

The channel length direction of a transistor refers to a direction in which a carrier moves between a source (a source region or a source electrode) and a drain (a drain region or a drain electrode), and the channel width direction refers to a direction perpendicular to the channel length direction in a plane parallel to a substrate.

In FIG. 15, the transistor 28t including a channel formation region in an oxide semiconductor film is formed over the transistor 70 including a channel formation region in a single crystal silicon substrate.

A substrate 400 where the transistor 70 is formed can be, for example, a silicon substrate, a germanium substrate, or a silicon germanium substrate. In FIG. 15, a single crystal silicon substrate is used as the substrate 400.

The transistor 70 is electrically isolated by an element isolation method. As the element isolation method, a trench isolation method (a shallow trench isolation (STI) method) or the like can be used. FIG. 15 illustrates an example where the trench isolation method is used to electrically isolate the transistor 70. Specifically, in FIG. 15, the transistor 70 is electrically isolated by element isolation using an element isolation region 401 formed in such a manner that an insulator including silicon oxide or the like is buried in a trench formed in the substrate 400 by etching or the like and then the insulator is removed partly by etching or the like.

In the case where the transistor 70 has the same polarity as the adjacent transistor, element isolation between the adjacent transistors is not necessarily performed. In that case, the layout area can be reduced.

In a projection of the substrate 400 that exists in a region other than the trench, an impurity region 402 and an impurity region 403 of the transistor 70 and a channel formation region 404 placed between the impurity regions 402 and 403 are provided. Further, the transistor 70 includes an insulating film 405 covering the channel formation region 404 and a gate electrode 406 that overlaps with the channel formation region 404 with the insulating film 405 provided therebetween.

In the transistor 70, a side portion and an upper portion of the projection in the channel formation region 404 overlap with the gate electrode 406 with the insulating film 405 positioned therebetween, so that carriers flow in a wide area including the side portion and the upper portion of the channel formation region 404. Therefore, an area over the substrate occupied by the transistor 70 can be reduced, and the number of transferred carriers in the transistor 70 can be increased. As a result, the on-state current and field-effect mobility of the transistor 70 are increased. Suppose the length in the channel width direction (channel width) of the projection in the channel formation region 404 is W, and the thickness of the projection in the channel formation region 404 is T. When the aspect ratio of the thickness T to the channel width W is high, a region where carriers flow becomes larger. Thus, the on-state current of the transistor 70 can be further increased and the field-effect mobility of the transistor 70 can be further increased.

Note that when the transistor 70 is formed using a bulk semiconductor substrate, the aspect ratio is preferably 0.5 or more, further preferably 1 or more.

An insulating film 411 is provided over the transistor 70. Openings are formed in the insulating film 411. Conductive films 412 and 413 that are electrically connected to the impurity regions 402 and 403, respectively, and a conductive film 414 that is electrically connected to the gate electrode 406 are formed in the openings.

The conductive film 412 is electrically connected to a conductive film 416 formed over the insulating film 411. The conductive film 413 is electrically connected to a conductive film 417 formed over the insulating film 411. The conductive film 414 is electrically connected to a conductive film 418 formed over the insulating film 411.

An insulating film 420 is provided over the conductive films 416 to 418. An insulating film 421 having a blocking effect of preventing diffusion of oxygen, hydrogen, and water is provided over the insulating film 420. As the insulating film 421 has higher density and becomes denser or has a fewer dangling bonds and becomes more chemically stable, the insulating film 421 has a higher blocking effect. The insulating film 421 that has the effect of blocking diffusion of oxygen, hydrogen, and water can be formed using, for example, aluminum oxide, aluminum oxynitride, gallium oxide, gallium oxynitride, yttrium oxide, yttrium oxynitride, hafnium oxide, or hafnium oxynitride. The insulating film 421 having an effect of blocking diffusion of hydrogen and water can be formed using, for example, silicon nitride or silicon nitride oxide.

An insulating film 422 is provided over the insulating film 421, and the transistor 28t is provided over the insulating film 422.

The transistor 28t includes, over the insulating film 422, a semiconductor film 430 including an oxide semiconductor, conductive films 432 and 433 functioning as source and drain electrodes and electrically connected to the semiconductor film 430, a gate insulating film 431 covering the semiconductor film 430, and a gate electrode 434 overlapping with the semiconductor film 430 with the gate insulating film 431 positioned therebetween. Note that an opening is formed in the insulating films 420 to 422. The conductive film 433 is connected to the conductive film 418 in the opening.

Note that in FIG. 15, the transistor 28t includes at least the gate electrode 434 on one side of the semiconductor film 430, and may further include a gate electrode overlapping with the semiconductor film 430 with the insulating film 422 positioned therebetween.

In the case where the transistor 28t has a pair of gate electrodes, one of the gate electrodes may be supplied with a signal for controlling the on/off state, and the other of the gate electrodes may be supplied with a potential from another element. In this case, potentials with the same level may be supplied to the pair of gate electrodes, or a fixed potential such as the ground potential may be supplied only to the other of the gate electrodes. By controlling the level of a potential supplied to the other of the gate electrodes, the threshold voltage of the transistor can be controlled.

In FIG. 15, the transistor 28t has a single-gate structure where one channel formation region corresponding to one gate electrode 434 is provided. However, the transistor 28t may have a multi-gate structure where a plurality of electrically connected gate electrodes are provided so that a plurality of channel formation regions are included in one active layer.

FIG. 15 illustrates an example in which the semiconductor film 430 included in the transistor 28t includes oxide semiconductor films 430a to 430c that are stacked in this order over the insulating film 422. However, in one embodiment of the present invention, the semiconductor film 430 of the transistor 28t may be formed using a single-layer metal oxide film.

Examples of Electronic Device

The semiconductor device of one embodiment of the present invention can be used for display devices, personal computers, or image reproducing devices provided with recording media (typically, devices which reproduce the content of recording media such as digital versatile discs (DVDs) and have displays for displaying the reproduced images). Other examples of electronic devices that can be equipped with the semiconductor device of one embodiment of the present invention are cellular phones, game machines including portable game machines, portable information terminals, e-book readers, cameras such as video cameras and digital still cameras, goggle-type displays (head mounted displays), navigation systems, audio reproducing devices (e.g., car audio systems and digital audio players), copiers, facsimiles, printers, multifunction printers, automated teller machines (ATM), vending machines, and medical devices. FIGS. 16A to 16F illustrate specific examples of these electronic devices.

Figure 16A:
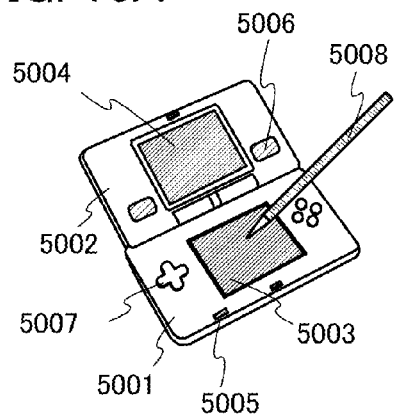
FIGS. 16A to 16F illustrate electronic devices.

FIG. 16A illustrates a portable game machine which includes a housing 5001, a housing 5002, a display portion 5003, a display portion 5004, a microphone 5005, a speaker 5006, an operation key 5007, a stylus 5008, and the like. The semiconductor device of one embodiment of the present invention can be used for a variety of integrated circuits included in portable game machines. Although the portable game machine in FIG. 16A has the two display portions 5003 and 5004, the number of display portions included in a portable game machine is not limited to this.

Figure 16B:
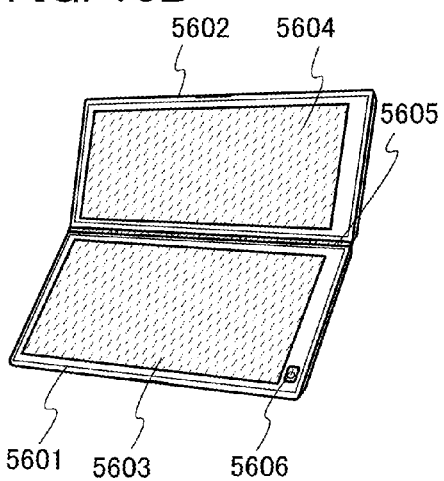

FIG. 16B illustrates a portable information terminal which includes a first housing 5601, a second housing 5602, a first display portion 5603, a second display portion 5604, a joint 5605, an operation key 5606, and the like. The semiconductor device of one embodiment of the present invention can be used for a variety of integrated circuits included in portable information terminals. The first display portion 5603 is provided in the first housing 5601, and the second display portion 5604 is provided in the second housing 5602. The first housing 5601 and the second housing 5602 are connected to each other with the joint 5605, and the angle between the first housing 5601 and the second housing 5602 can be changed with the joint 5605. Images displayed on the first display portion 5603 may be switched in accordance with the angle at the joint 5605 between the first housing 5601 and the second housing 5602. A display device with a position input function may be used as at least one of the first display portion 5603 and the second display portion 5604. Note that the position input function can be added by providing a touch panel in a display device. Alternatively, the position input function can be added by provision of a photoelectric conversion element called a photosensor in a pixel portion of a display device.

Figure 16C:
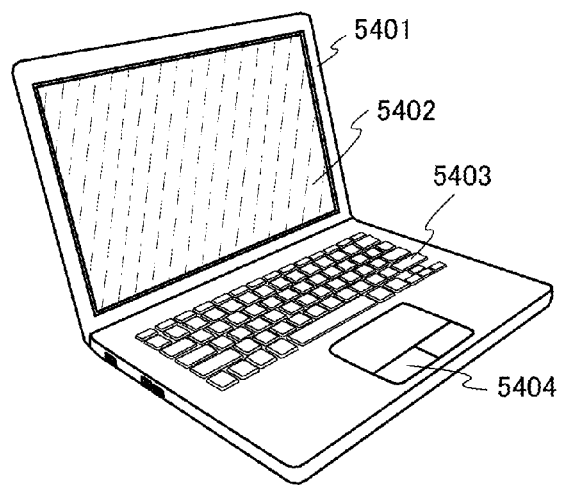

FIG. 16C illustrates a notebook type personal computer which includes a housing 5401, a display portion 5402, a keyboard 5403, a pointing device 5404, and the like. The semiconductor device of one embodiment of the present invention can be used for a variety of integrated circuits included in notebook type personal computers.

Figure 16D:
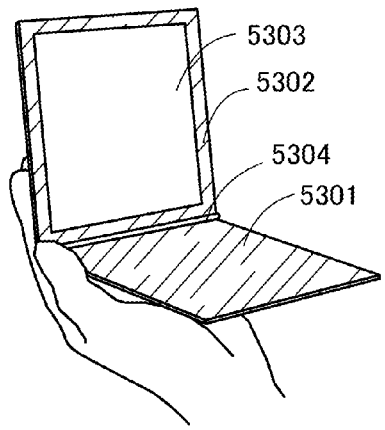

FIG. 16D illustrates a hand mirror which includes a first housing 5301, a second housing 5302, a mirror 5303, a joint 5304, and the like. The first housing 5301 and the second housing 5302 are connected with the joint 5304, and the angle between the first housing 5301 and the second housing 5302 can be changed with the joint 5304. A lighting device which is one mode of a semiconductor device of one embodiment of the present invention can be used in the first housing 5301 and the second housing 5302. The lighting device includes a surface-light-emitting element. This light-emitting element may have a structure of switching between the light-emission state and the non-light-emission state in accordance with the angle between the first housing 5301 and the second housing 5302 at the joint 5304.

Figure 16E:
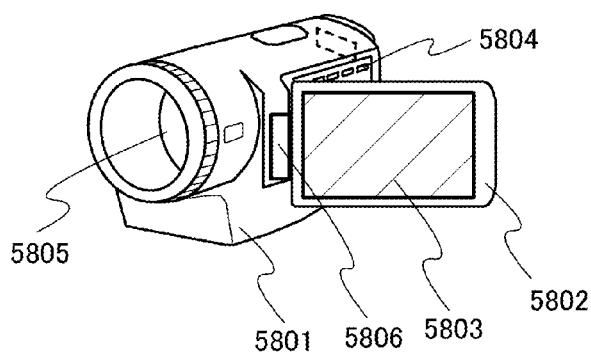

FIG. 16E illustrates a video camera which includes a first housing 5801, a second housing 5802, a display portion 5803, operation keys 5804, a lens 5805, a joint 5806, and the like. The semiconductor device of one embodiment of the present invention can be used for a variety of integrated circuits included in video cameras. The operation keys 5804 and the lens 5805 are provided in the first housing 5801, and the display portion 5803 is provided in the second housing 5802. The first housing 5801 and the second housing 5802 are connected to each other with the joint 5806, and the angle between the first housing 5801 and the second housing 5802 can be changed with the joint 5806. Images displayed on the display portion 5803 may be switched in accordance with the angle at the joint 5806 between the first housing 5801 and the second housing 5802.

Figure 16F:
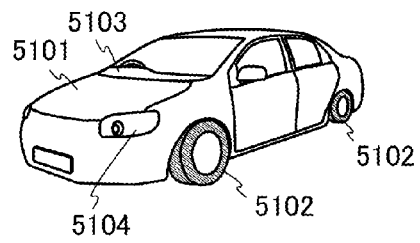

FIG. 16F illustrates a passenger car which includes a car body 5101, wheels 5102, a dashboard 5103, lights 5104, and the like. The semiconductor device of one embodiment of the present invention can be used for a variety of integrated circuits included in passenger cars.

For example, in this specification and the like, transistors with a variety of structures can be used, without limitation to a certain type. For example, a transistor including single crystal silicon or a transistor including a non-single-crystal semiconductor film typified by amorphous silicon, polycrystalline silicon, microcrystalline (also referred to as microcrystal, nanocrystal, or semi-amorphous) silicon, or the like can be used. Alternatively, a thin film transistor (TFT) obtained by thinning such a semiconductor, or the like can be used. In the case of using the TFT, there are various advantages. For example, since the TFT can be formed at a temperature lower than that of the case of using single crystal silicon, manufacturing cost can be reduced and a larger manufacturing apparatus can be used. Since a larger manufacturing apparatus can be used, TFTs can be formed using a large substrate. Alternatively, a substrate having low heat resistance can be used because of a low manufacturing temperature.

Note that by using a catalyst (e.g., nickel) in forming microcrystalline silicon, crystallinity can be further increased and a transistor having excellent electrical characteristics can be formed. At this time, crystallinity can be increased by just performing heat treatment without performing laser irradiation. Note that polycrystalline silicon or microcrystalline silicon can be formed without use of a catalyst (e.g., nickel).

Examples of the transistor are a transistor including a compound semiconductor (e.g., SiGe or GaAs) or an oxide semiconductor (e.g., Zn—O, In—Ga—Zn—O, In—Zn—O, In—Sn—O (ITO), Sn—O, Ti—O, Al—Zn—Sn—O (AZTO), or In—Sn—Zn—O) and a thin film transistor including a thin film of such a compound semiconductor or oxide semiconductor. Thus, the manufacturing temperature can be low and for example, such a transistor can be formed at room temperature. Accordingly, the transistor can be formed directly on a substrate having low heat resistance, such as a plastic substrate or a film substrate. Note that such a compound semiconductor or oxide semiconductor can be used for not only a channel portion of a transistor but also for other applications.

Note that for example, a transistor formed by an ink-jet method or a printing method can be used. Accordingly, such a transistor can be formed at room temperature, can be formed at a low vacuum, or can be formed using a large substrate. Thus, the transistor can be formed without using a mask (reticle), which enables the layout of the transistor to be easily changed. Alternatively, the transistor can be formed without using a resist, leading to reductions in material cost and the number of steps. Furthermore, a film can be formed only in a portion where the film is needed, a material is not wasted as compared with the case of employing a manufacturing method by which etching is performed after the film is formed over the entire surface, so that the cost can be reduced.

Note that for example, a transistor including an organic semiconductor or a carbon nanotube can be used. Thus, such a transistor can be formed over a flexible substrate. A device including a transistor which includes an organic semiconductor or a carbon nanotube can resist an impact.

Note that transistors with a variety of different structures can be used. For example, a MOS transistor, a junction transistor, a bipolar transistor, or the like can be used. By using a MOS transistor as a transistor, the size of the transistor can be reduced. Thus, a large number of transistors can be mounted. By using a bipolar transistor as a transistor, a large amount of current can flow. Thus, a circuit can be operated at high speed. Note that a MOS transistor and a bipolar transistor may be formed over one substrate, in which case reductions in power consumption and size, high-speed operation, and the like can be achieved.

For example, in this specification and the like, when it is explicitly described that X and Y are connected, the case where X and Y are electrically connected, the case where X and Y are functionally connected, and the case where X and Y are directly connected are included therein. Accordingly, another element may be interposed between elements having a connection relation shown in drawings and texts, without limiting to a predetermined connection relation, for example, the connection relation shown in the drawings and the texts.

Here, X and Y each denote an object (e.g., a device, an element, a circuit, a line, an electrode, a terminal, a conductive film, a layer, or the like).

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. A switch is controlled to be on or off. That is, a switch is conducting or not conducting (is turned on or off) to determine whether current flows therethrough or not. Alternatively, the switch has a function of selecting and changing a current path.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a dc-dc converter, a step-up dc-dc converter, or a step-down dc-dc converter) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. Note that for example, in the case where a signal output from X is transmitted to Y even when another circuit is interposed between X and Y, X and Y are functionally connected.

Note that when it is explicitly described that X and Y are connected, the case where X and Y are electrically connected (i.e., the case where X and Y are connected with another element or another circuit provided therebetween), the case where X and Y are functionally connected (i.e., the case where X and Y are functionally connected with another circuit provided therebetween), and the case where X and Y are directly connected (i.e., the case where X and Y are connected without another element or another circuit provided therebetween) are included therein.

For example, any of the following expressions can be used for the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y.

Examples of the expressions include, "X, Y, a source (or a first terminal or the like) of a transistor, and a drain (or a second terminal or the like) of the transistor are electrically connected to each other, and X the source (or the first terminal or the like) of the transistor, the drain (or the second terminal or the like) of the transistor, and Y are electrically connected to each other in this order", "a source (or a first terminal or the like) of a transistor is electrically connected to X a drain (or a second terminal or the like) of the transistor is electrically connected to Y, and X the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X the source (or the first terminal or the like) of the transistor, the drain (or the second terminal or the like) of the transistor, and Y are provided to be connected in this order". When the connection order in a circuit structure is defined by an expression similar to the above examples, a source (or a first terminal or the like)

and a drain (or a second terminal or the like) of a transistor can be distinguished from each other to specify the technical scope.

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

Note that a content (or may be part of the content) described in one embodiment may be applied to, combined with, or replaced by a different content (or may be part of the different content) described in the embodiment and/or a content (or may be part of the content) described in one or a plurality of different embodiments.

Note that in each embodiment, a content described in the embodiment is a content described with reference to a variety of diagrams or a content described with a text described in this specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in one or a plurality of different embodiments, much more diagrams can be formed.

Note that contents that are not specified in any drawing or text in the specification can be excluded from one embodiment of the invention. Alternatively, when the range of a value that is defined by the maximum and minimum values is described, part of the range is appropriately narrowed and part of the range is removed, whereby one embodiment of the invention can be constituted excluding part of the range can be constructed. In this manner, it is possible to specify the technical scope of one embodiment of the present invention so that a conventional technology is excluded, for example.

As a specific example, a diagram of a circuit including a first transistor to a fifth transistor is illustrated. In that case, it can be specified that the circuit does not include a sixth transistor in the invention. It can be specified that the circuit does not include a capacitor in the invention. It can be specified that the circuit does not include a sixth transistor with a particular connection structure in the invention. It can be specified that the circuit does not include a capacitor with a particular connection structure in the invention. For example, it can be specified that a sixth transistor whose gate is connected to a gate of the third transistor is not included in the invention. For example, it can be specified that a capacitor whose first electrode is connected to the gate of the third transistor is not included in the invention.

As another specific example, a description of a value, "a voltage is preferably higher than or equal to 3 V and lower than or equal to 10 V" is given. In that case, for example, it can be specified that the case where the voltage is higher than or equal to –2 V and lower than or equal to 1 V is excluded from one embodiment of the invention. For example, it can be specified that the case where the voltage is higher than or equal to 13 V is excluded from one embodiment of the invention. Note that, for example, it can be specified that the voltage is higher than or equal to 5 V and lower than or equal to 8 V in the invention. For example, it can be specified that the voltage is approximately 9 V in the invention. For example, it can be specified that the voltage is higher than or equal to 3 V and lower than or equal to 10 V but is not 9 V in the invention. Note that even when the description "a value is preferably in a certain range" or "a value preferably satisfies a certain condition" is given, the value is not limited to the description.

In other words, a description of a value that includes a term "preferable", "preferably", or the like does not necessarily limit the value.

As another specific example, a description "a voltage is preferred to be 10 V" is given. In that case, for example, it can be specified that the case where the voltage is higher than or equal to –2 V and lower than or equal to 1 V is excluded from one embodiment of the invention. For example, it can be specified that the case where the voltage is higher than or equal to 13 V is excluded from one embodiment of the invention.

As another specific example, a description "a film is an insulating film" is given to describe properties of a material. In that case, for example, it can be specified that the case where the insulating film is an organic insulating film is excluded from one embodiment of the invention. For example, it can be specified that the case where the insulating film is an inorganic insulating film is excluded from one embodiment of the invention. For example, it can be specified that the case where the insulating film is a conductive film is excluded from one embodiment of the invention. For example, it can be specified that the case where the insulating film is a semiconductor film is excluded from one embodiment of the invention.

As another specific example, the description of a stacked structure, "a film is provided between an A film and a B film" is given. In that case, for example, it can be specified that the case where the film is a stacked film of four or more layers is excluded from the invention. For example, it can be specified that the case where a conductive film is provided between the A film and the film is excluded from the invention.

Note that various people can implement one embodiment of the invention described in this specification and the like. However, different people may be involved in the implementation of the invention. For example, in the case of a transmission/reception system, the following case is possible: Company A manufactures and sells transmitting devices, and Company B manufactures and sells receiving devices. As another example, in the case of a light-emitting device including a transistor and a light-emitting element, the following case is possible: Company A manufactures and sells semiconductor devices including transistors, and Company B purchases the semiconductor devices, provides light-emitting elements for the semiconductor devices, and completes light-emitting devices.

In such a case, one embodiment of the invention can be constituted so that a patent infringement can be claimed against each of Company A and Company B. In other words, one embodiment of the invention can be constituted so that only Company A implements the embodiment, and another embodiment of the invention can be constituted so that only Company B implements the embodiment. One embodiment of the invention with which a patent infringement suit can be filed against Company A or Company B is clear and can be regarded as being disclosed in this specification or the like. For example, in the case of a transmission/reception system, even when this specification or the like does not include a description of the case where a transmitting device is used alone or the case where a receiving device is used alone, one embodiment of the invention can be constituted by only the transmitting device and another embodiment of the invention can be constituted by only the receiving device. Those embodiments of the invention are clear and can be regarded as being disclosed in this specification or the like. Another example is as follows: in the case of a light-emitting device including a transistor and a light-emitting element, even when this specification or the like does not include a description of the case where a semiconductor device including the transistor is used alone or the case where a light-emitting device including the light-emitting element is used alone, one embodiment of the invention can be constituted by only the semiconductor device including the transistor and another embodiment of the invention can be constituted by only the light-emitting device including the light-emitting element. Those embodiments of the invention are clear and can be regarded as being disclosed in this specification or the like.

Note that in this specification and the like, it might be possible for those skilled in the art to constitute one embodiment of the invention even when portions to which all the terminals of an active element (e.g., a transistor or a diode), a passive element (e.g., a capacitor or a resistor), or the like are connected are not specified. In other words, one embodiment of the invention can be clear even when connection portions are not specified. Further, in the case where a connection portion is disclosed in this specification and the like, it can be determined that one embodiment of the invention in which a connection portion is not specified is disclosed in this specification and the like, in some cases. In particular, in the case where the number of portions to which the terminal is connected might be plural, it is not necessary to specify the portions to which the terminal is connected. Therefore, it might be possible to constitute one embodiment of the invention by specifying only portions to which some of terminals of an active element (e.g., a transistor or a diode), a passive element (e.g., a capacitor or a resistor), or the like are connected.

Note that in this specification and the like, it might be possible for those skilled in the art to specify the invention when at least the connection portion of a circuit is specified. Alternatively, it might be possible for those skilled in the art to specify the invention when at least a function of a circuit is specified. In other words, when a function of a circuit is specified, one embodiment of the invention can be clear. Furthermore, it can be determined that one embodiment of the invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, in a diagram or a text described in one embodiment, it is possible to take out part of the diagram or the text and constitute an embodiment of the invention. Thus, in the case where a diagram or a text related to a certain portion is described, the context taken out from part of the diagram or the text is also disclosed as one embodiment of the invention, and one embodiment of the invention can be constituted. The embodiment of the invention is clear. Therefore, for example, in a diagram or text in which one or more active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like are described, part of the diagram or the text is taken out, and one embodiment of the invention can be constituted. For example, from a circuit diagram in which N circuit elements (e.g., transistors or capacitors; N is an integer) are provided, it is possible to constitute one embodiment of the invention by taking out M circuit elements (e.g., transistors or capacitors; M is an integer, where M<N). As another example, it is possible to constitute one embodiment of the invention by taking out M layers (M is an integer, where M<N) from a cross-sectional view in which N layers (N is an integer) are provided. As another example, it is possible to constitute one embodiment of the invention by taking out M elements (M is an integer, where M<N) from a flow chart in which N elements (N is an integer) are provided. As another example, it is possible to take out some given elements from a sentence "A includes B, C, D, E, or F" and constitute one embodiment of the invention, for example, "A includes B and E", "A includes E and F", "A includes C, E, and F", or "A includes B, C, D, and E".

Note that in the case where at least one specific example is described in a diagram or a text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the invention is clear.

Note that in this specification and the like, a content described in at least a diagram (which may be part of the diagram) is disclosed as one embodiment of the invention, and one embodiment of the invention can be constituted. Therefore, when a certain content is described in a diagram, the content is disclosed as one embodiment of the invention even when the content is not described with a text, and one embodiment of the invention can be constituted. In a similar manner, part of a diagram, which is taken out from the diagram, is disclosed as one embodiment of the invention, and one embodiment of the invention can be constituted. The embodiment of the invention is clear.

Here, the current source supplies constant current even when the magnitude of voltage applied to both ends of the current source is changed, or the current source supplies constant current to an element connected to the current source even when the potential of the element is changed.

There is a voltage source as a power source other than a current source. The voltage source has a function of supplying constant voltage even when current flowing through a circuit connected to the voltage source is changed. The voltage source and the current source each have a function of supplying voltage and current, but the function of the voltage source and the function of the current source are different in what is supplied at a constant level even when one factor is changed. The current source has a function of supplying constant current event when voltage across both ends is changed. The voltage source has a function of supplying constant voltage even when current is changed.

This application is based on Japanese Patent Application serial no. 2014-038497 filed with Japan Patent Office on Feb. 28, 2014, the entire contents of which are hereby incorporated by reference.

What is claimed is:

1. A DC-DC converter comprising:
 a first circuit configured to generate a first signal, the first signal containing data on current flowing through a load;
 a second circuit configured to amplify the first signal to generate a first amplified signal;
 a third circuit configured to generate a second signal, the second signal containing data on voltage applied to the load;
 a fourth circuit configured to hold the second signal;
 a fifth circuit configured to amplify the second signal held by the fourth circuit to generate a second amplified signal;
 a sixth circuit configured to correct a difference in electrical characteristics between the second circuit and the fifth circuit;
 a seventh circuit configured to convert a first voltage to a second voltage, the first voltage being supplied from a power source, and the second voltage being supplied to the load; and an eighth circuit configured to control a level of the second voltage generated by the seventh circuit in accordance with either the first amplified signal or the second amplified signal.

2. The DC-DC converter according to claim 1,
the first circuit comprising:
   a switch; and
   a first resistor,
   wherein a ground potential is supplied to one of terminals of the first resistor.

3. The DC-DC converter according to claim 1,
the third circuit comprising:
   a second resistor and a third resistor,
   wherein one of terminals of the load is electrically connected to one of terminals of the second resistor.

4. A semiconductor device comprising the DC-DC converter according to claim 1 and a logic circuit.

5. An electronic device comprising the DC-DC converter according to claim 1 and a display device.

6. A DC-DC converter comprising:
   a first circuit configured to generate a first signal, the first signal containing data on current flowing through a load;
   a second circuit configured to amplify the first signal to generate a first amplified signal;
   a third circuit configured to generate a second signal, the second signal containing data on voltage applied to the load;
   a fourth circuit configured to hold the second signal;
   a fifth circuit configured to amplify the second signal held by the fourth circuit to generate a second amplified signal;
   a sixth circuit configured to correct a difference in electrical characteristics between the second circuit and the fifth circuit;
   a seventh circuit configured to convert a first voltage to a second voltage, the first voltage being supplied from a power source, and the second voltage being supplied to the load; and
   an eighth circuit configured to control a level of the second voltage generated by the seventh circuit in accordance with either the first amplified signal or the second amplified signal,
   the sixth circuit comprising:
      a first switch and a second switch;
      a first capacitor and a second capacitor; and
      a ninth circuit,
   wherein:
      the first capacitor is configured to hold a first potential of the first amplified signal,
      the first potential is supplied to the first capacitor through the first switch,
      the second capacitor is configured to hold a second potential of the second amplified signal,
      the second potential is supplied to the second capacitor through the second switch,
      the ninth circuit is configured to generate a first current having a ratio that corresponds to a potential difference between the first potential and the second potential, and a second current having a ratio that corresponds to a potential difference between the first potential and the second potential, and
      the first current and the second current are input to the fifth circuit, so that the difference in electrical characteristics between the second circuit and the fifth circuit is corrected.

7. The DC-DC converter according to claim 6,
wherein each of the first switch and the second switch comprises a transistor including an oxide semiconductor film in a channel formation region.

8. The DC-DC converter according to claim 6,
the first circuit comprising:
   a third switch; and
   a first resistor,
   wherein a ground potential is supplied to one of terminals of the first resistor.

9. The DC-DC converter according to claim 6,
the third circuit comprising:
   a second resistor and a third resistor,
   wherein one of terminals of the load is electrically connected to one of terminals of the second resistor.

10. A semiconductor device comprising the DC-DC converter according to claim 6 and a logic circuit.

11. An electronic device comprising the DC-DC converter according to claim 6 and a display device.

12. A DC-DC converter comprising:
   a first circuit configured to generate a first signal, the first signal containing data on current flowing through a load;
   a second circuit configured to amplify the first signal to generate a first amplified signal;
   a third circuit configured to generate a second signal, the second signal containing data on voltage applied to the load;
   a fourth circuit configured to hold the second signal;
   a fifth circuit configured to amplify the second signal held by the fourth circuit to generate a second amplified signal;
   a sixth circuit configured to correct a potential of the first amplified signal in accordance with a difference in electrical characteristics between the second circuit and the fifth circuit;
   a seventh circuit configured to correct a potential of the second amplified signal in accordance with the difference in electrical characteristics between the second circuit and the fifth circuit;
   an eighth circuit configured to convert a first voltage to a second voltage, the first voltage being supplied from a power source, and the second voltage being supplied to the load; and
   a ninth circuit configured to control a level of the second voltage generated by the eighth circuit in accordance with either the first amplified signal or the second amplified signal.

13. The DC-DC converter according to claim 12,
the first circuit comprising:
   a switch; and
   a first resistor,
   wherein a ground potential is supplied to one of terminals of the first resistor.

14. The DC-DC converter according to claim 12,
the third circuit comprising:
   a second resistor and a third resistor,
   wherein one of terminals of the load is electrically connected to one of terminals of the second resistor.

15. A semiconductor device comprising the DC-DC converter according to claim 12 and a logic circuit.

16. An electronic device comprising the DC-DC converter according to claim 12 and a display device.

* * * * *